United States Patent
Myers et al.

(10) Patent No.: US 10,747,645 B2
(45) Date of Patent: Aug. 18, 2020

(54) SELECTIVELY TRACING PORTIONS OF COMPUTER PROCESS EXECUTION

(71) Applicant: Microsoft Technology Licensing, LLC, Redmond, WA (US)

(72) Inventors: Del Myers, Seattle, WA (US); Jackson Davis, Carnation, WA (US); Thomas Lai, Redmond, WA (US); Patrick Nelson, Redmond, WA (US); Jordi Mola, Bellevue, WA (US); Juan Carlos Arevalo Baeza, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 182 days.

(21) Appl. No.: 15/965,026

(22) Filed: Apr. 27, 2018

(65) Prior Publication Data

US 2019/0332519 A1    Oct. 31, 2019

(51) Int. Cl.
G06F 11/36    (2006.01)
G06F 11/30    (2006.01)
G06F 11/34    (2006.01)

(52) U.S. Cl.
CPC ........ *G06F 11/3636* (2013.01); *G06F 11/302* (2013.01); *G06F 11/3495* (2013.01); *G06F 11/3612* (2013.01)

(58) Field of Classification Search
CPC .... G06F 11/30; G06F 11/302; G06F 11/3466; G06F 11/3495; G06F 11/36;

(Continued)

(56) References Cited

U.S. PATENT DOCUMENTS 3,707,725 A    12/1972    Dellheim
4,205,370 A    5/1980    Hirtle (Continued)

OTHER PUBLICATIONS

Method and System for Dynamically Enabling and Disabling Trace Points, IP.com Disclosure No. IPCOM000198647D, Publication Date: Aug. 11, 2010 (Year: 2010).*

(Continued)

*Primary Examiner* — Andrew M. Lyons
(74) *Attorney, Agent, or Firm* — Workman Nydegger

(57) ABSTRACT

Expressly turning tracing on and off at each juncture between code that a developer wants to have traced and other code may reduce trace file size but adds computational cost. Described technologies support selectively tracing a process's execution, with some extra tracing done beyond the code the developer wanted traced, but with significantly reduced computational cost, by reducing the number of trace enablement and disablement operations. A trace controller uses a tracing disablement distance variable whose values indicate the computational distance from trace disablement. A distance variable modifier automatically moves the distance variable closer to a stop-tracing value as the process executes. The amount of extra tracing is balanced against the reduction in trace enablement/disablement operations by tuning thresholds, based on information about routine size and computational cost. Operation of the trace controller is illustrated by sample APIs, a tracing state diagram, and a side-by-side comparison, among other items.

20 Claims, 9 Drawing Sheets

US 10,747,645 B2
Page 2

(58) Field of Classification Search
CPC .......... G06F 11/3604; G06F 11/3612; G06F 11/3636; G06F 11/3644; G06F 11/3664
USPC .................. 717/124, 127–128, 130–131
See application file for complete search history.

(56) References Cited

U.S. PATENT DOCUMENTS

| | | | | |
|---|---|---|---|---|
| 5,754,839 | A * | 5/1998 | Pardo | G06F 9/3842 712/227 |
| 5,974,392 | A * | 10/1999 | Endo | G06Q 10/06311 705/7.14 |
| 6,161,216 | A * | 12/2000 | Shagam | G06F 11/3624 714/E11.209 |
| 6,189,141 | B1 * | 2/2001 | Benitez | G06F 8/443 714/E11.209 |
| 6,351,844 | B1 * | 2/2002 | Bala | G06F 9/3808 712/209 |
| 6,526,567 | B1 | 2/2003 | Cobbett et al. | |
| 6,550,056 | B1 * | 4/2003 | Mizumoto | G06F 11/3636 714/E11.21 |
| 7,143,394 | B1 * | 11/2006 | Shadmon | G06F 11/3612 717/130 |
| 7,194,664 | B1 * | 3/2007 | Fung | G06F 11/3636 714/32 |
| 7,389,494 | B1 * | 6/2008 | Cantrill | G06F 11/3624 717/125 |
| 7,827,539 | B1 * | 11/2010 | Wygodny | G06F 11/3409 717/128 |
| 7,913,120 | B2 * | 3/2011 | Williams | G06F 11/3664 714/30 |
| 8,042,007 | B1 * | 10/2011 | Chan | G06F 11/3648 714/45 |
| 8,091,073 | B2 * | 1/2012 | Bell, Jr. | G06F 11/36 717/126 |
| 8,141,051 | B2 * | 3/2012 | Huang | G06F 11/3409 717/127 |
| 8,312,435 | B2 * | 11/2012 | Wygodny | G06F 11/3636 717/124 |
| 8,370,609 | B1 * | 2/2013 | Favor | G06F 9/3808 712/225 |
| 8,490,073 | B2 * | 7/2013 | Mitran | G06F 11/3644 717/128 |
| 9,772,927 | B2 * | 9/2017 | Gounares | G06F 3/0484 |
| 9,864,672 | B2 * | 1/2018 | Seto | G06F 11/3636 |
| 9,875,173 | B2 | 1/2018 | Marron et al. | |
| 9,916,232 | B2 | 3/2018 | Voccio et al. | |
| 10,296,436 | B2 * | 5/2019 | Hildebrand | G06F 11/3495 |
| 2002/0199172 | A1 * | 12/2002 | Bunnell | G06F 11/3466 717/128 |
| 2003/0088854 | A1 | 5/2003 | Wygodny et al. | |
| 2004/0083460 | A1 * | 4/2004 | Pierce | G06F 9/4486 717/131 |
| 2005/0060521 | A1 * | 3/2005 | Wang | G06F 11/3636 712/227 |
| 2006/0046854 | A1 | 3/2006 | Arevalo Baeza et al. | |
| 2006/0200809 | A1 * | 9/2006 | Grcevski | G06F 8/443 717/140 |
| 2006/0230391 | A1 * | 10/2006 | Alexander, III | G06F 11/3616 717/130 |
| 2006/0277527 | A1 | 12/2006 | Davis et al. | |
| 2006/0279443 | A1 * | 12/2006 | Agarwala | G06F 11/3636 341/139 |
| 2007/0011492 | A1 * | 1/2007 | Swaine | G06F 11/3636 714/35 |
| 2007/0043861 | A1 * | 2/2007 | Baron | H04L 41/0631 709/224 |
| 2008/0120523 | A1 * | 5/2008 | Cox | G06F 11/3636 714/45 |
| 2008/0126828 | A1 * | 5/2008 | Girouard | G06F 11/3644 714/2 |
| 2008/0127054 | A1 | 5/2008 | Stubbs et al. | |
| 2008/0127055 | A1 | 5/2008 | Davis et al. | |
| 2008/0134148 | A1 * | 6/2008 | Clark | G06F 11/3636 717/128 |
| 2008/0178158 | A1 * | 7/2008 | Hong | G06F 11/3419 717/128 |
| 2008/0244533 | A1 * | 10/2008 | Berg | G06F 11/3447 717/128 |
| 2009/0006506 | A1 * | 1/2009 | DiFlora | G06F 12/0269 |
| 2009/0055594 | A1 * | 2/2009 | Berg | G06F 11/3447 711/136 |
| 2009/0089764 | A1 | 4/2009 | Lai et al. | |
| 2009/0113251 | A1 | 4/2009 | Goossen et al. | |
| 2010/0180159 | A1 * | 7/2010 | Bittles | G06F 11/3636 714/38.1 |
| 2011/0145662 | A1 | 6/2011 | Yuan et al. | |
| 2011/0289301 | A1 * | 11/2011 | Allen | G06F 11/3636 712/227 |
| 2012/0017123 | A1 * | 1/2012 | Masser | G06F 11/3466 714/45 |
| 2012/0030521 | A1 * | 2/2012 | Aranguren | G06F 11/3636 714/45 |
| 2012/0233614 | A1 * | 9/2012 | Adler | G06F 11/3676 718/100 |
| 2012/0297254 | A1 * | 11/2012 | Shazly | G06F 11/3476 714/45 |
| 2012/0304156 | A1 | 11/2012 | Feiveson et al. | |
| 2012/0331351 | A1 | 12/2012 | Davis et al. | |
| 2013/0036403 | A1 * | 2/2013 | Geist | G06F 11/3636 717/125 |
| 2013/0074050 | A1 * | 3/2013 | Masser | G06F 9/44 717/128 |
| 2013/0091387 | A1 * | 4/2013 | Bohnet | G06F 11/3636 714/38.1 |
| 2013/0132780 | A1 * | 5/2013 | Bohnet | G06F 11/3636 714/45 |
| 2013/0219369 | A1 | 8/2013 | Rector et al. | |
| 2013/0283102 | A1 * | 10/2013 | Krajec | G06F 11/3636 714/38.1 |
| 2013/0283243 | A1 * | 10/2013 | Bates | G06F 11/3624 717/129 |
| 2013/0283246 | A1 * | 10/2013 | Krajec | G06F 11/3466 717/130 |
| 2013/0283247 | A1 * | 10/2013 | Krajec | G06F 11/3466 717/130 |
| 2014/0040897 | A1 | 2/2014 | Davis et al. | |
| 2014/0068349 | A1 * | 3/2014 | Scott | G06F 11/3495 714/45 |
| 2014/0282388 | A1 * | 9/2014 | Malkin | G06F 11/3636 717/113 |
| 2014/0317604 | A1 * | 10/2014 | Gataullin | G06F 11/3676 717/128 |
| 2014/0380102 | A1 | 12/2014 | Lindo et al. | |
| 2015/0127991 | A1 | 5/2015 | Davis et al. | |
| 2015/0135194 | A1 | 5/2015 | Alvarez Cavazos et al. | |
| 2015/0143344 | A1 | 5/2015 | Davis | |
| 2015/0161397 | A1 | 6/2015 | Cook et al. | |
| 2015/0199259 | A1 | 7/2015 | Paveza et al. | |
| 2015/0199261 | A1 | 7/2015 | Paveza et al. | |
| 2015/0347269 | A1 | 12/2015 | Nelson et al. | |
| 2015/0347271 | A1 * | 12/2015 | Payne | G06F 11/3636 717/128 |
| 2015/0347273 | A1 * | 12/2015 | Krajec | G06F 11/3433 717/128 |
| 2015/0347274 | A1 | 12/2015 | Taylor et al. | |
| 2015/0378870 | A1 * | 12/2015 | Marron | G06F 11/362 717/128 |
| 2016/0044081 | A1 * | 2/2016 | Pingenot | H04L 67/141 709/219 |
| 2016/0070636 | A1 | 3/2016 | Furtwangler et al. | |
| 2016/0092341 | A1 * | 3/2016 | Ma | G06F 11/3636 714/45 |
| 2016/0124834 | A1 | 5/2016 | Davis et al. | |
| 2016/0147640 | A1 * | 5/2016 | Huang | G06F 9/524 717/130 |
| 2016/0239357 | A1 | 8/2016 | Davis et al. | |
| 2016/0246643 | A1 * | 8/2016 | Xu | G06F 9/485 |
| 2017/0249230 | A1 * | 8/2017 | Tsirkin | G06F 11/362 |
| 2017/0300400 | A1 | 10/2017 | Davis | |

(56) References Cited

U.S. PATENT DOCUMENTS

| | | | |
|---|---|---|---|
| 2018/0024913 A1* | 1/2018 | Hassan | G06F 11/3668 |
| | | | 717/130 |
| 2018/0060213 A1 | 3/2018 | Mola | |
| 2018/0060215 A1 | 3/2018 | Mola | |
| 2018/0067835 A1* | 3/2018 | Hildebrand | G06F 11/3495 |
| 2018/0210806 A1* | 7/2018 | Abdul | G06F 11/3466 |
| 2019/0065339 A1* | 2/2019 | Mola | G06F 11/3612 |
| 2019/0332520 A1 | 10/2019 | Myers et al. | |

OTHER PUBLICATIONS

P. Methavanitpong, T. Isshiki, D. Li and H. Kunieda, "Branch bitstream [Machine Instruction-level System Tracing]," 2015 6th International Conference of Information and Communication Technology for Embedded Systems (IC-ICTES), Hua-Hin, 2015, pp. 1-6. (Year: 2015).*

S. D. Sharma and M. Dagenais, "Hardware-assisted instruction profiling and latency detection," in The Journal of Engineering, vol. 2016, No. 10, pp. 367-376, 10 2016. (Year: 2016).*

S. Fischmeister and P. Lam, "Time-Aware Instrumentation of Embedded Software," in IEEE Transactions on Industrial Informatics, vol. 6, No. 4, pp. 652-663, Nov. 2010. (Year: 2010).*

J. Odom, J. K. Hollingsworth, L. DeRose, K. Ekanadham and S. Sbaraglia, "Using Dynamic Tracing Sampling to Measure Long Running Programs," SC '05: Proceedings of the 2005 ACM/IEEE Conference on Supercomputing, Seattle, WA, USA, 2005, pp. 59-59. (Year: 2005).*

J. Passing, A. Schmidt, M. von Lowis and A. Polze, "NTrace: Function Boundary Tracing for Windows on IA-32," 2009 16th Working Conference on Reverse Engineering, Lille, 2009, pp. 43-52. (Year: 2009).*

"Embedded Trace Macrocell", Retrieved from: http://infocenter.arm.com/help/topic/com.arm.doc.ihi0014q/IHI0014Q_etm_architecture_spec.pdf, Jan. 1, 2011, 420 Pages.

Laadan, "Transparent, Lightweight Application Execution Replay on Commodity Multiprocessor Operating Systems", In Proceedings of the ACM SIGMETRICS International Conference on Measurement and Modeling of Computer Systems, Jun. 14, 2010, pp. 155-166.

"International Search Report and Written Opinion Issued in PCT Application No. PCT/US19/027400", dated Jul. 30, 2019, 13 Pages.

"International Search Report and Written Opinion Issued in PCT Application No. PCT/US19/028422", dated Jul. 29, 2019, 17 Pages.

"What is the purpose of a Data Access Layer?", retrieved from <<https://stackoverflow.com/questions/59942/what-is-the-purpose-of-a-data-access-layer>>, Nov. 21, 2010, 4 pages.

"Data access layer", retrieved from <<https://en.wikipedia.org/wiki/Data_access_layer>>, Aug. 21, 2017, 2 pages.

"Elm Debugger", retrieved from <<http://debug.elm-lang.org/>>, copyright 2014, 4 pages.

"Microsoft/PTVS", retrieved from <<https://github.com/Microsoft/PTVS>>, no later than Mar. 1, 2018, 2 pages.

"How does reverse debugging work?", retrieved from <<https://stackoverflow.com/questions/1470434/how-does-reverse-debugging-work>>, Sep. 24, 2009, 5 pages.

Bhansali, et al., "Framework for Instruction-level Tracing and Analysis of Program Executions", retrieved from <<http://static.usenix.org/events/vee06/full_papers/p154-bhansali.pdf>>, 2006, 10 pages.

Mußler, et al., "A Generic Binary Instrumenter and Heuristics to Select Relevant Instrumentation Points", retrieved from <<http://juser.fz-juelich.de/record/12504/files/J%C2%A9%C6%A1l_4335_Mu%C2%A9ler.pdf>>, Nov. 2010, 110 pages.

"Time Travel Debugging—Record a trace", retrieved from <<https://docs.microsoft.com/en-us/windows-hardware/drivers/debugger/time-travel-debugging-record>>, Sep. 22, 2017, 5 pages.

"Microsoft/PTVS", retrieved from <<https://github.com/Microsoft/PTVS/tree/master/Python/Product/Debugger.Concord>>, no later than Mar. 1, 2018, 1 page.

Cabral, et al., "RAIL: code instrumentation for .NET", retrieved from <<https://www.researchgate.net/publication/221001208_RAIL_code_instrumentation_for_NET>>, Jan. 2005, 7 pages.

"RevDeBug", retrieved from <<https://www.revdebug.com/>>, no later than Mar. 1, 2018, 7 pages.

"RevDeBug Tutorial", retrieved from <<https://revdebug.com/doc/tutorial/2.5.0.0/Selectiverecording-Whitelisting>>, no later than Mar. 1, 2018, 6 pages.

"Reverse/'Time Traveling' Debuggers for Javascript", retrieved from <<https://stackoverflow.com/questions/21841808/reverse-time-traveling-debuggers-for-javascript>>, Feb. 18, 2014, 1 page.

"Rider", retrieved from <<https://www.jetbrains.com/rider/>>, no later than Mar. 1, 2018, 4 pages.

Tamches, et al., "Fine-Grained Dynamic Instrumentation of Commodity Operating System Kernels", retrieved from <<http://pages.cs.wisc.edu/~paradyn/ParadynWeek/1999-notes/tamches.pdf>>, 1999, 24 pages.

"Reverse debugging, time travel debugging", retrieved from <<https://undo.io/resources/whitepapers/reverse-debugging-whitepaper/>>, no later than Mar. 1, 2018, 10 pages.

JamesP, "Time Travel Debugging in WinDbg Preview!", retrieved from <<https://blogs.msdn.microsoft.com/windbg/2017/09/25/time-travel-debugging-in-windbg-preview/>>, Sep. 25, 2017, 35 pages.

"Tracing_(software)", retrieved from <<https://en.wikipedia.org/wiki/Tracing_(software)>>, Aug. 30, 2017, 4 pages.

"UndoDB", retrieved from <<https://undo.io/products/undodb/>>, no later than Mar. 1, 2018, 7 pages.

"What is the principle of 'Time Travel Debugger'?", retrieved from <<https://stackoverflow.com/questions/42104003/what-is-the-principle-of-time-travel-debugger>>, Oct. 8, 2017, 3 pages.

BValzer, "EXDAMS—Extendable Debugging and Monitoring System", retrieved from <<http://www.dtic.mil/dtic/tr/fulltext/u2/686373.pdf>>, 1969, 40 pages.

Coetzee, "Combining reverse debugging and live programming towards visual thinking in computer programming", retrieved via <<http://scholar.sun.ac.za/handle/10019.1/96853>>, Mar. 2015, 105 pages.

"Non Final Office Action Issued in U.S. Appl. No. 16/174,273", dated Jan. 10, 2020, 22 Pages.

* cited by examiner

MANAGED CODE ENVIRONMENT 200

NATIVE CODE ENVIRONMENT 300

COMPUTATIONAL COST COMPARISON 1300.
ASSUME A AND C2 ARE DESIGNATED FOR TRACING.
IN DV EXAMPLE ON LEFT, ASSUME LOW > SIZE OF B1.
ROUTINE A IS RECORDED EITHER WITH OR WITHOUT DV.

| WITH DV | WITHOUT DV |
|---|---|
| ENTER ROUTINE A | ENTER ROUTINE A |
| TRACE-ON() | TRACE-ON() |
| DV = HIGH | |
| EXECUTE TO B CALL | EXECUTE TO B CALL |
| DV = LOW | TRACE-OFF() |
| ENTER B1: NOT DESIGNATED | ENTER B1: NOT DESIGNATED |
| EXECUTE B1 | EXECUTE B1 |
| RECORD B1 | |
| RETURN TO A | RETURN TO A |
| BACK IN A, DV = HIGH | BACK IN A, TRACE-ON() |
| TRY-TO-TRACE() [ALREADY ON] | |
| EXECUTE TO C CALL | EXECUTE TO C CALL |
| DV = LOW | TRACE-OFF() |
| ENTER C2: DESIGNATED | ENTER C2: DESIGNATED |
| DV = HIGH | TRACE-ON() |
| TRY-TO-TRACE() [ALREADY ON] | |
| EXECUTE C2 | EXECUTE C2 |
| RECORD C2 | RECORD C2 |
| DV = LOW | TRACE-OFF() |
| RETURN TO A | RETURN TO A |
| BACK IN A, DV = HIGH | BACK IN A, TRACE-ON() |
| TRY-TO-TRACE() [ALREADY ON] | |
| EXECUTE REST OF A | EXECUTE REST OF A |
| DV = LOW | TRACE-OFF() |
| EXIT A | EXIT A |
| EXECUTE UNTIL D == 0 | EXECUTE REST OF PROCESS |
| TRACE-OFF() | |
| EXECUTE REST OF PROCESS | |

Fig. 13

SELECTIVELY TRACING PORTIONS OF COMPUTER PROCESS EXECUTION

BACKGROUND

Computer software is often complex. Part of the complexity may arise from the nature of the work a program is designed to perform, e.g., tracking large numbers of real world items or ongoing transactions over hours or longer periods of time, coordinating activities with other complex software, controlling complex hardware, and so on. In almost any real-world use of software, complexity also arises because many details are introduced and should be correctly managed in order to instruct computer hardware how to perform real-world work that is initially described much less precisely in English or another natural language. That is, the transformation from a high-level description to a low-level implementation which is executable by a computer system, inevitably introduces complexity. Even programming language source code, which is more precise than natural languages, is still at a relatively high level and therefore is ambiguous, being open to various understandings and implementations. Source code is transformed into low-level instructions that can be directly executed by computational hardware, with many details being introduced and choices being made during that transformation.

Complexity introduces the all-too-often realized possibility of programming errors, a.k.a. "bugs". The process of identifying the cause of a bug and attempting to modify a program to remediate or remove the bug's impact is referred to as "debugging". Specialized software tools which assist debugging are called "debuggers". The program being debugged is called the "debuggee".

Debugging is perhaps easiest when a developer can run the debuggee slowly, or at full speed, or pause execution of the debuggee, all at will, and can examine all state information of the debuggee at any point in the debuggee's execution. This is known as "live process debugging". However, such full access to a debuggee is often not available. For example, the debuggee may be production software that cannot be debugged live without violating service agreements or harming the reputation, security, or finances of an interested party. Unacceptable harms may occur if the live process debuggee is paused for seconds at a time while the developer examines variable values, checks to see which functions were called with which parameter values, reviews the source code, considers possible explanations for the bug, and devises tests that might help identify, remediate, or eliminate the bug.

Accordingly, sometimes state information is recorded as the debuggee executes, to be examined later without substantially pausing the debuggee's execution. For instance, some or all of the memory values pertinent to the debuggee's execution, and operations on those values, may be recorded over time in an execution trace. Some debuggers support use of such a trace to replay the execution of the traced debuggee, without the debuggee being a live process. With some debuggers, the debuggee execution captured in a trace can be replayed in forward or in reverse, thus permitting "time travel", "reverse", or "historic" debugging.

However, tracing generally slows down the debuggee. Accordingly, advances in tracing a software program's execution while avoiding undue impact on the software's performance help improve the information that is available for use in debugging, and thus will tend to improve the function of debuggee computer systems by facilitating the mediation and eradication of their bugs.

SUMMARY

Some technologies described herein are directed to the technical activity of creating an execution trace which is focused on portions of a program most likely to contain a bug of interest, thereby improving trace-based debugging. Some teachings are directed to specific computational mechanisms which balance the computational cost of enabling or disabling tracing with the computational and storage costs of tracing code which is not helpful for a particular debugging effort. Technical mechanisms are described for adapting an environment to create a focused trace from either a native process or a managed process. Specific technical tools and techniques are described here in response to the challenge of focusing a trace on user code of interest, in order to reduce the undesirable performance reduction and trace size increases that result from tracing non-user code such as kernel, compiler, garbage collector, or standard library code. Other technical activities pertinent to teachings herein will also become apparent to those of skill in the art.

Some selective execution tracing embodiments described herein include a processor, a digital memory in operable communication with the processor, and an executable code for a computer-implemented process. The executable code has portions designated for tracing, and other portions which are not designated for tracing, either implicitly or explicitly. An execution tracer is present, with a trace disabler to disable tracing by the execution tracer, and a trace enabler to enable tracing by the execution tracer. A trace controller includes a tracing disablement distance variable whose varying values indicate a current computation distance from executing the trace disabler. That is, the larger the distance variable is when tracing is enabled, the more of the executable code's execution will be traced before tracing is disabled. The trace controller invokes the trace disabler in conjunction with the distance variable having a stop-tracing value (e.g., zero). The trace controller may subsequently invoke the trace enabler in conjunction with the distance variable not having the stop-tracing value. A distance variable modifier incrementally moves the distance variable closer to the stop-tracing value as the executable code executes. For instance, the distance variable modifier may decrement a positive value in the distance variable, thereby moving the distance variable closer to zero, and tracing will be disabled when the distance variable reaches zero.

By using the distance variable to control tracing disablement, instead of expressly calling the trace disabler every time the execution exits a portion of the executable code that is designated for tracing, an embodiment may reduce the computational cost of tracing. This can be beneficial in various circumstances, because tracing is used for a variety of purposes, e.g., during debugging, to assist code comprehension, for statistical analysis, and to promote other goals. This reduction in computational cost comes in exchange for tracing some uninteresting code. The trace file may be larger than it would be if only interesting code were traced, but the performance impact of the tracing tends to be smaller than it would be if only the interesting code were traced. In a debugging context, for instance, code is deemed "uninteresting" relative to a particular bug when the code is outside the suspect portion of the code, making it unlikely to be helpful in identifying and mitigating or removing the bug. For example, code in items such as a kernel, a compiler, a system library, or a garbage collector is uninteresting in an effort to identify a bug in user code that is outside of those items.

Some embodiments described herein pertain to configuring an environment to perform computer-implemented selective execution tracing. Some pertain in particular to configuring executable code for tracing that is controlled using a tracing disablement distance variable, namely, a variable whose values indicate relative distances in computational cost from a disablement of tracing. One approach embeds in an executable code a nonzero high-count-ensuring code which is configured to upon execution set the distance variable to a value that is not less than a high-count threshold. This approach associates with the executable code an instruction count decrement mechanism which is configured to decrement the distance variable as the executable code executes. This approach also connects an execution tracer to the executable code. This approach configures a trace controller to disable tracing when the distance variable reaches a stop-tracing value, and also configures the trace controller to enable tracing during at least part of an execution of the executable code when the distance variable differs from the stop-tracing value.

Some embodiments pertain to actually performing computer-implemented selective execution tracing. One embodiment sets a tracing disablement distance variable at an entry point of a code unit. The distance variable is set to a value which is not less than a nonzero high-count threshold. The distance variable measures relative distance in computational cost from tracing disablement. In conjunction with setting the distance variable to a value that is not less than the high-count threshold, this embodiment makes a call which enables tracing by an execution tracer for at most the distance variable's value number of instructions if tracing was not already enabled, and which leaves tracing enabled if tracing was already enabled. At an exit point of the code unit, this embodiment sets the distance variable to a nonzero low-count threshold which is less than the high-count threshold. The distance variable is automatically decremented as a computer processor executes instructions of a computer process that contains the code unit. An execution tracer traces the execution of the computer process when the value of the distance variable is positive and the execution tracer is enabled, and this embodiment disables tracing of the execution of the computer process if the value of the distance variable reaches zero.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 13 is a computational cost comparison showing side-by-side tracing control implementations in a tracing scenario;

DETAILED DESCRIPTION

Overview

Figure 1:
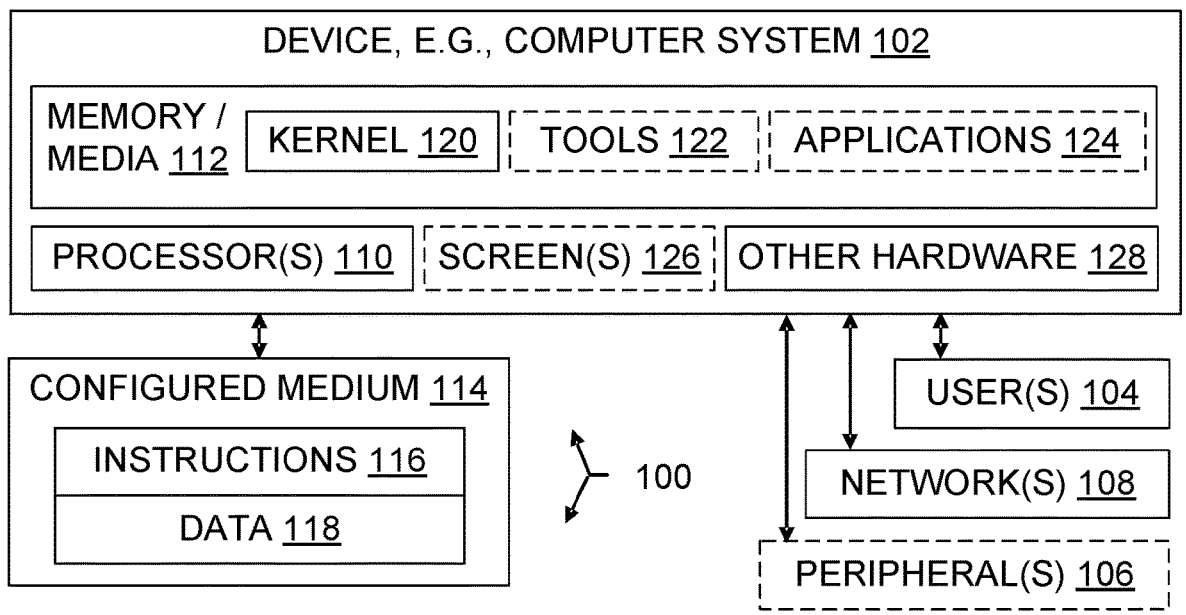
FIG. 1 is a block diagram illustrating a computer system and also illustrating a configured storage medium.

Software developers are often tasked with investigating difficult to reproduce software bugs, or bugs that occur on machines that they do not have access to for direct debugging purposes. In these cases, it can be helpful to have a system that automatically records the execution of the process to a file so that the issue can be debugged later, or debugged without interrupting execution of the process. However, such recordings can cause large overhead, and extremely large file sizes.

In particular, debugging in a production cloud environment poses serious technical challenges. For example, suppose a particular request R to an online shopping cart is not working. How can a developer debug the processing of request R without slowing down the processing of all the other requests and with a minimal slowdown in the processing of request R? To find the bug, the developer uses information about what is happening inside the code, e.g., a way to see the values of variables at one or more points of interest during the processing of request R.

Trace-based debugging innovations help overcome technical challenges left unresolved by conventional approaches. For instance, many conventional debuggers and debugging methods allow a developer to set halt breakpoints to get information about variable values. Halt breakpoints are instructions that halt execution so the developer has time to examine memory contents at a given point in the processing and consider possible explanations for what is observed. But in a production environment, a halt breakpoint could halt the processing of numerous requests, and that is undesirable. Even halting only a single thread may result in an undesirably abandoned request and have unforeseen side-effects that hinder debugging, or reduce performance, or both.

Some familiar debugging approaches involve adding print statements to print the value of particular variables at particular points in the code, or adding other code, e.g., to test the value of a variable to see whether it is what the developer expects it to be at that point in the code. But these approaches may require recompiling and redeploying code, which is not favored in a production environment, particularly if recompiling and redeploying are to be done multiple times as part of an iterative debugging process to find and fix a single bug. Also, the developer may be asked to identify bugs in code that the developer does not have source for and thus cannot add print statements to and recompile.

The developer could inject an operation into the request processing code at execution time to make a copy of part or all of the memory pertaining to the request. The copy may include a "snapshot" 216 (an in-memory copy of a process that shares memory allocation pages with the original process via copy-on-write) or a "dump" file 218 (a serialized copy of the process), or both. Some conventional debuggers can read a dump file or a snapshot and, given appropriate metadata, can present memory content in a format that shows variable values translated from binary into informative structures that include variable names and that display variable values based on the respective data types of the variables. But dumping memory to a file takes significant time, which slows down the processing of all requests in the example scenario, not merely request R. Even though making a snapshot is much faster than creating a dump file, it may take a developer many attempts to find a useful point in the processing to take the memory snapshot that reveals the bug, and snapshots consume space in RAM. To get a view of the memory at another point in time than the execution time captured in a dump file or a snapshot, another memory copy could be created. To get a view of the memory at any point in time from a live process, the live process is used.

Figure 2:
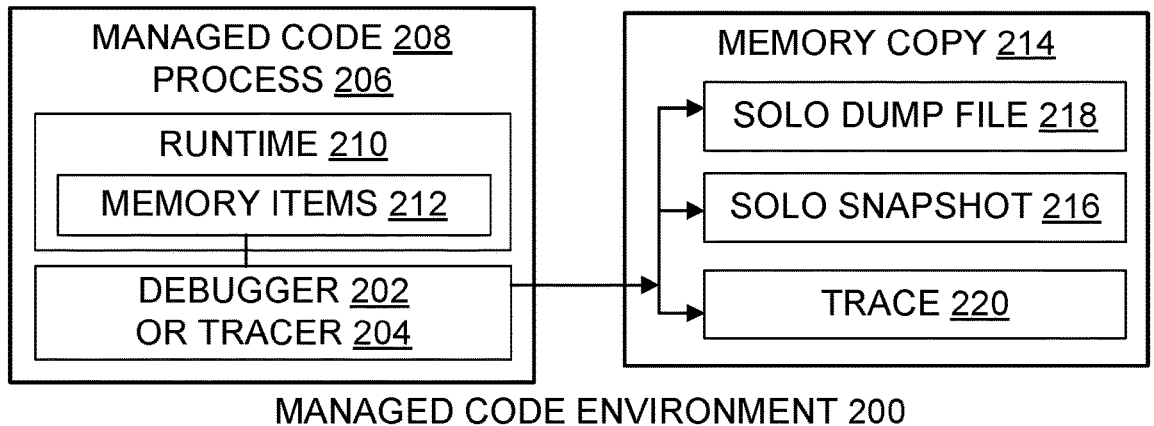
FIG. 2 is a block diagram illustrating aspects of tracing a managed code process.
Figure 3:
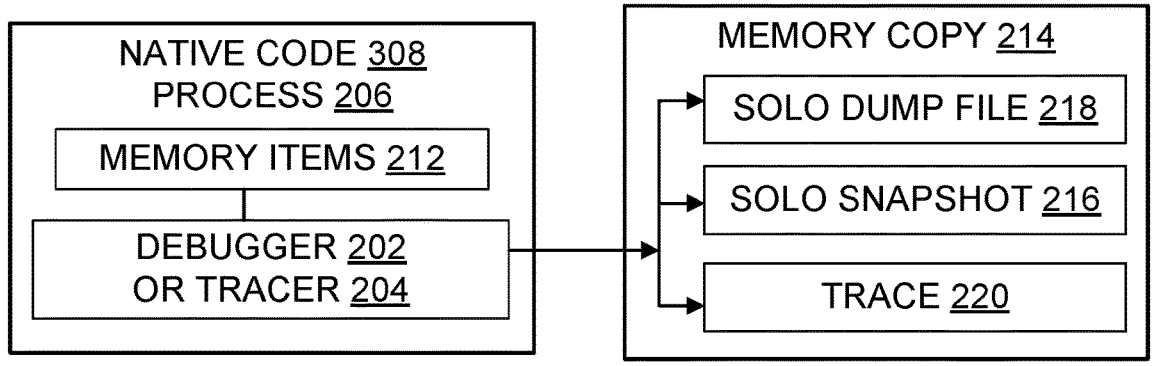
FIG. 3 is a block diagram illustrating aspects tracing a native code process.

In many modern computing systems, as illustrated in the FIG. 2 example of a managed process environment 200, the live process 206 is a managed code 208 process which includes a runtime 210 in addition to relying on an operating system 120. Managed code 208 includes or relies on a runtime 210 for garbage collection or code compilation (i.e, JIT compilation or compilation of intermediate language code) or both, in addition to relying on a kernel 120. Garbage collection may utilize object reachability analysis, object reference counting, or other strategies. By way of contrast, FIG. 3 shows an example of a native process environment 300 including a native code 308 live process 206 which lacks a runtime 210. Native code 308 interfaces directly with the kernel 120, without utilizing a runtime 210.

Teachings provided herein may be applied beneficially in either or both kinds of environment 200, 300. As illustrated, a tool 122 such as a debugger 202 or an execution tracer 204 can inject operations into a live process 206 to make a copy 214 of part or all of the memory items 212 that are employed during execution of the process 206. In the online shopping cart scenario, for example, the tracer 204 could inject operations into the request processing code to make a copy of part or all of the memory 112, 212 that pertains to the problematic request R. Instructions 116 to implement memory copying may be injected by a tool 122 before or during execution of the code 208, 308. Code injection, also referred to as "code instrumentation", is a technical process by which a binary representation of executable code is decoded and re-written at execution time to add additional functionality to the program.

Processes that lack runtimes can be controlled directly by a debugger through insertion of halt breakpoints. But processes that depend on a runtime are not directly controlled by a debugger 202 because their runtime effectively hides from the debugger details 212 such as memory locations, memory contents, and instruction pointers. To show the developer what is in the memory during debugging, the debugger sends the runtime a message asking for current memory values, the runtime sends the values to the debugger in a reply message, and the debugger displays in some user interface the values it received in the reply message.

The runtime 210 also controls execution of a live debuggee. In one example, to set a breakpoint at an intermediate language (IL) instruction in method Foo, at offset 28, a message is sent to the runtime asking it to set a breakpoint at Foo, offset 28. Then a thread within the runtime will receive that message, translate Foo IL offset 28 into a machine instruction residing at memory address 0x4567123512395, and then write a breakpoint instruction at that location.

The debugger 202 user interface displays the debugger's representations of the program state to the user graphically. Some examples of program state are a list of threads, the next line of source code to execute on each thread, a call stack for each thread, a set of variables in each frame of the call stack, the values of those variables, and so on.

In some implementations, a runtime translating portion of the debugger 202 is responsible for translating between low-level concepts such as memory cells and registers, on the one hand, and the runtime abstractions, on the other. Examples of runtime abstractions include a list of threads, one or more callstacks for each thread, and the IL instruction that will be executed next. Note that a callstack at the runtime layer of abstraction is not necessarily the same as a callstack at the source code level of abstraction, e.g., the callstack of a virtual machine doesn't match the virtual callstack of the IL code being executed in the virtual machine.

It is possible for a tracer 204 to create an execution trace 220 of a process. The trace can then be replayed using emulation of the hardware 102. Sometimes this traced process is written in a high-level language which requires the process 206 to be executed by a runtime framework 210. The trace itself may be difficult to debug because the trace data reflects a view at a low level (e.g., the runtime or just-in-time compiled code or both), rather than the high-level language the program was written in. Some tracing technologies don't provide the high-level view of a process that a developer 104 may well prefer. Most high-level runtimes require that the runtime itself provide information about programs running within its framework. Thus, conventional debugging may require the process to be executing within the runtime, which is not an option when debugging is based on a trace instead of a live process.

Like any other process, a runtime can be traced. However, debugging software other than a runtime is more common than debugging a runtime, and unless indicated otherwise it is assumed herein that a traced process may exclude some or all code that is part of the runtime itself. Trace files 420 which trace only the execution of a process that relied on a runtime and do not trace the runtime itself, do not fully support reading the values of runtime-managed objects from a trace file with a conventional debugging approach. There is no executing runtime for the debugger to fully correlate memory locations with objects and other variables, and thus give meaning to the memory values that are exposed by the trace. To control the execution of a live process that is executing code reliant on a runtime, the debugger may send the runtime a message requesting an operation such as "step" or "run", and then the runtime executes the operation on behalf of the debugger. This functionality does not work with a trace file that has no currently executing runtime.

Dump files 218 and snapshots 216 are similar to traces in terms of the runtime being unavailable to use. The runtime may be represented in the dump or snapshot or trace, but it is not executing and thus cannot be called into.

Nonetheless, trace files 420 can be made part of a debugging environment. Some trace-based debugging tools extend the power of debugging so that debuggers can read memory 112 from a trace file at multiple points in execution time chosen by a developer. One approach inserts a data access layer between the trace and the high-level language debugger. The data access layer understands the runtime's data structures. This allows inspection of the high-level process.

In some situations, a developer can use a "time travel" debugger to control execution replay to run forward in execution time or backward in execution time when replaying a recorded trace 220, thereby leveraging the ability of a debugger to present memory in useful high-level (e.g., named and data type-based) variable presentations, not only for snapshots as before but also now for a continuous replay of a segment of execution time recorded during code execution. Memory values captured in the trace can then be inspected by the developer in a high-level presentation at multiple points, based on the low-level data recorded in the trace file. Of course, memory inspection requires reading memory cell values from the trace, or else reading other values and somehow gaining from them useful information about the memory values that are sought during the replay. Heuristics may help debuggers and other tools obtain useful information about memory values even when the trace does not expressly state the value at a desired point in execution time.

Using a data access layer when debugging with a process dump or snapshot as a data source, one can view information about the high-level program state within the runtime. Suitably adapted, the debugger 202 can apply a runtime (high-level) view of a process trace that has been recorded as machine-level operations. For purposes of the present application only, "machine-level" operations are those specified at the level of assembly language or intermediate language or lower.

In some situations, a trace 220 records process activity at the machine level, e.g., in terms of register activity and the reads and writes at particular memory addresses which are specified in binary or hexadecimal rather than being specified by the identifiers in the source code that was compiled to create the process. Some traces 220 can be replayed using emulation of the hardware 102.

Tracing overhead includes processor cycles and storage space (in RAM, on disk, or both). Some tracing overhead is caused by recording (copying 214) parts of the process 206 that are not directly related to the issue that is to be debugged. Teachings herein discuss tools and techniques for selectively choosing segments of the process 206 that will be recorded. A "segment" is a portion of the process, and may include one or more routines, threads, libraries, or other proper subsets of the process in the form of its underlying code or memory activities. Segment selection reduces the processing time and memory overhead of tracing, as well as disk consumption by traces 220. In production environments, and many other environments, process execution traces 220 tend to be large (hundreds or thousands of megabytes), and tracing causes substantial processor overhead (execution slower by a factor of ten or more) when tracing is enabled. Solutions presented herein help reduce file size, memory pressure, and processor load by making choices during process execution about what portions of the software should be traced.

Some embodiments described herein may be viewed by some people in a broader context. For instance, concepts such as disabling, distance, enabling, size, and tracing may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as identifying tradeoffs, selecting a balance to pursue between traced program performance, tracing execution slowdowns, trace relevance, and trace size, and implementing mechanisms which assist the pursuit of the selected balance. Other media, systems, and methods involving disabling, distance, enabling, size, or tracing are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems. For example, some embodiments help debug systems by making debug tracing more efficient. Some embodiments mitigate performance reductions in systems when the execution of those systems is traced.

For instance, some embodiments help reduce the amount of irrelevant or uninteresting execution trace that a developer must sift through to find a bug. By reducing the storage requirements for trace files without omitting relevant trace data, some embodiments make effective tracing feasible even when it would otherwise not be feasible due to limits on available storage.

Also, by letting a traced program run at full speed when it is doing operations that are not being debugged, some embodiments give developers more time to perform debugging analysis within a given work period. Developers spend less time waiting while a tool traces uninteresting operations like garbage collection, JIT compilation, or standard library routines, which are part of an execution but are not likely to contain the bug that is being pursued. The time saved by reducing irrelevant tracing can be spent on code replay, examination of variables, and other debugging analysis.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement selective tracing algorithm steps using a tracing disablement distance variable and one or more related thresholds, as disclosed herein.

Technical effects provided by some embodiments include more efficient use by developers of debugging time, reduced trace file size, and reduced slowdown of traced program execution.

Some embodiments include technical adaptations such as a tracing disablement distance variable, routines and other mechanisms that modify or check the tracing disablement distance variable. Some adaptations include trace selection tuning conditions. These conditions implement a balance between the computational cost of enabling or disabling tracing, on the one hand, and the computational and storage costs of tracing code which is not helpful for a particular debugging effort, on the other hand.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.

Figure 10:
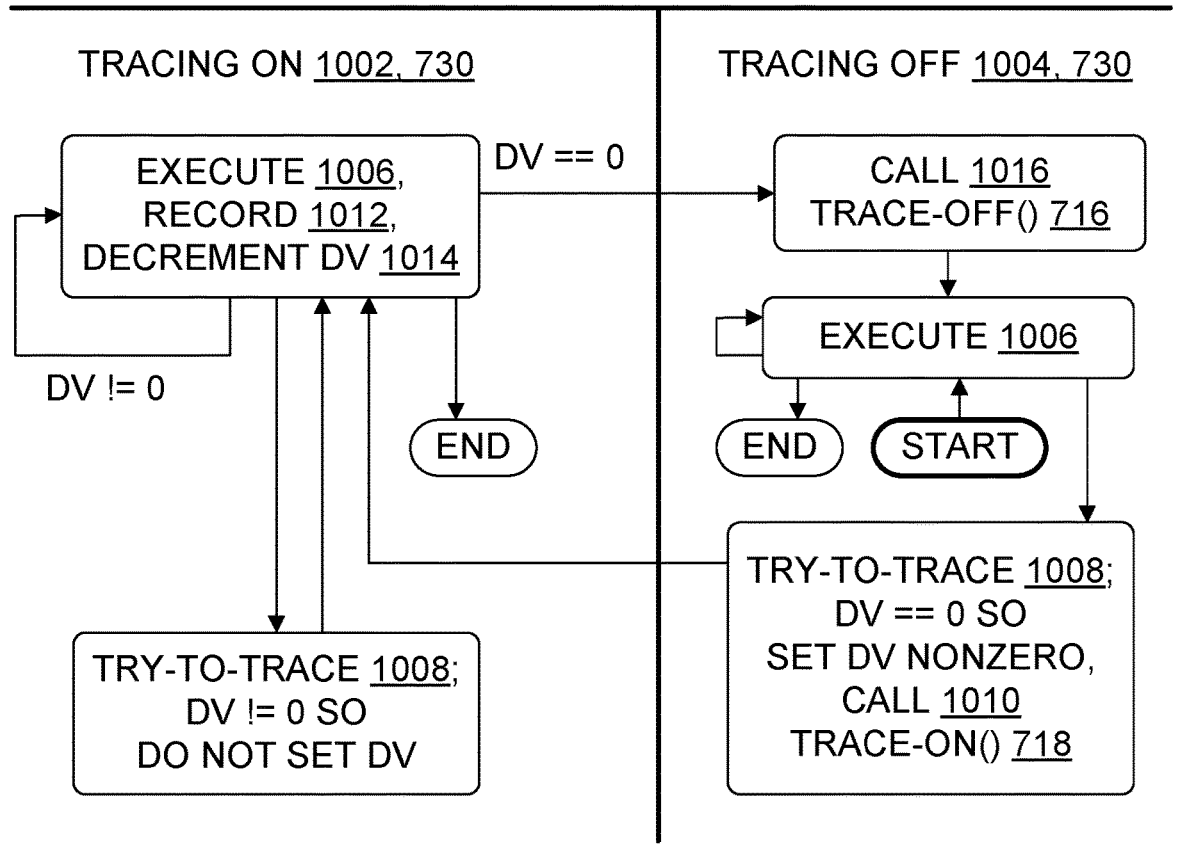
FIG. 10 is a tracing state diagram.

ALU: arithmetic and logic unit
API: application program interface
BIOS: basic input/output system
CD: compact disc
CPU: central processing unit
DV: distance variable, as in "tracing disablement distance variable"
DVD: digital versatile disk or digital video disc
FPGA: field-programmable gate array
FPU: floating point processing unit
GPU: graphical processing unit
GUI: graphical user interface
ID: identifier
IDE: integrated development environment, sometimes also called "interactive development environment"
JIT: just-in-time, as in "JIT compiler" or "JIT compilation"
OS: operating system
RAM: random access memory
ROM: read only memory
"==" indicates "equals", "!=" indicates "does not equal", and "=" indicates "is assigned the value"; these abbreviations are used in FIGS. 10 and 13
"( )" indicates a routine, e.g., "trace-on( )" is a routine named "trace-on"; a routine may also be referred to by its name without parentheses, e.g., "A", "B", "B1", "C", and "C2" in FIG. 13 refer to routines Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which may occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, Internet of Things nodes, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which is interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network environment.

"Execution time point" means a specific point of execution for a processing unit or thread, especially as relates to traced execution. References herein to a "particular execution time" or an "execution time t" or the like are references to an execution time point. An execution time point may be implemented as a timecode variable or timecode value, or as a relative position in a trace or other record of execution activity, for example. An execution time point to being "prior to" or "later than" an execution time point tb implies that a relative ordering of the two execution time points is determined. Similarly, a "younger" execution time point is one that is later than an "older" execution time point.

Information in a trace about the ordering of traced events may be incomplete. Thus, a trace may have sufficient information to establish that an event A is prior to an event B, or to establish that an event D is later than an event C. But the relative order of events may also be partially or fully indeterminate, so far as the trace is concerned. The trace may show that event E is not after event F, but that does not necessarily imply E is before F; similarly, a trace may show that an event K is not before an event J without the trace also showing that K is after J. The trace may also lack sufficient information to establish any ordering of two particular events relative to one another.

"Timecode" means a monotonically changing value which can be used to impose an ordering on at least some events in an execution trace. It is expected that timecodes will often be monotonically increasing values, but timecodes could also be implemented as monotonically decreasing values. Some examples of timecodes include instruction counters, clock times (a.k.a. clock ticks), and entirely artificial (not based on a register or instruction) monotonic values. Depending on the trace, all or some or none of the traced events may have respective associated timecodes. When timecodes are present, they may be unique, or they may be merely monotonic because some timecode values are repeated.

"Memory cell" means an addressable unit of memory. Some examples include a byte or word in RAM or in ROM, a processor register, a cache line, and other addressable units of memory.

An "emulator" performs "emulation" which provides the same functionality as original hardware, but uses a different implementation or different hardware or both. One example is a CPU Emulator, which acts like a CPU and can be used to execute code like the original CPU hardware, but has a different implementation than the original CPU, e.g., the emulator may run on entirely different physical hardware.

"Recording" and "tracing" are used interchangeably herein, to refer to the act of creating or extending a trace.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that are not realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as enabling tracing, copying trace data, and disabling tracing, are understood herein as requiring and providing speed and accuracy that are not obtainable by human mental steps, in addition to their inherently digital nature (a human mind cannot interface directly with an executing process or with a trace file). This is well understood by persons of skill in the art, but others may sometimes benefit from being informed or reminded of the facts. Unless stated otherwise, embodiments are presumed to be capable of operating at scale in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following:

appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, is to be deemed part of the structures identified in the application for zac widgets and help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as associating, configuring, confirming, connecting, controlling, copying, decrementing, designating, disabling, embedding, enabling, entering, executing, exiting, installing, invoking, measuring, moving, recording, running, satisfying, selecting, setting, tracing, tuning, using (and associates, associated, configures, configured, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, being mere energy, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media or mere energy, on the other hand. A transmission medium is a propagating signal or a carrier wave computer readable medium or mere energy. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination is contrary to policies calling for patent specifications to be concise and for readers to be knowledgeable in the technical fields concerned.

LIST OF REFERENCE NUMERALS

Figure 4:
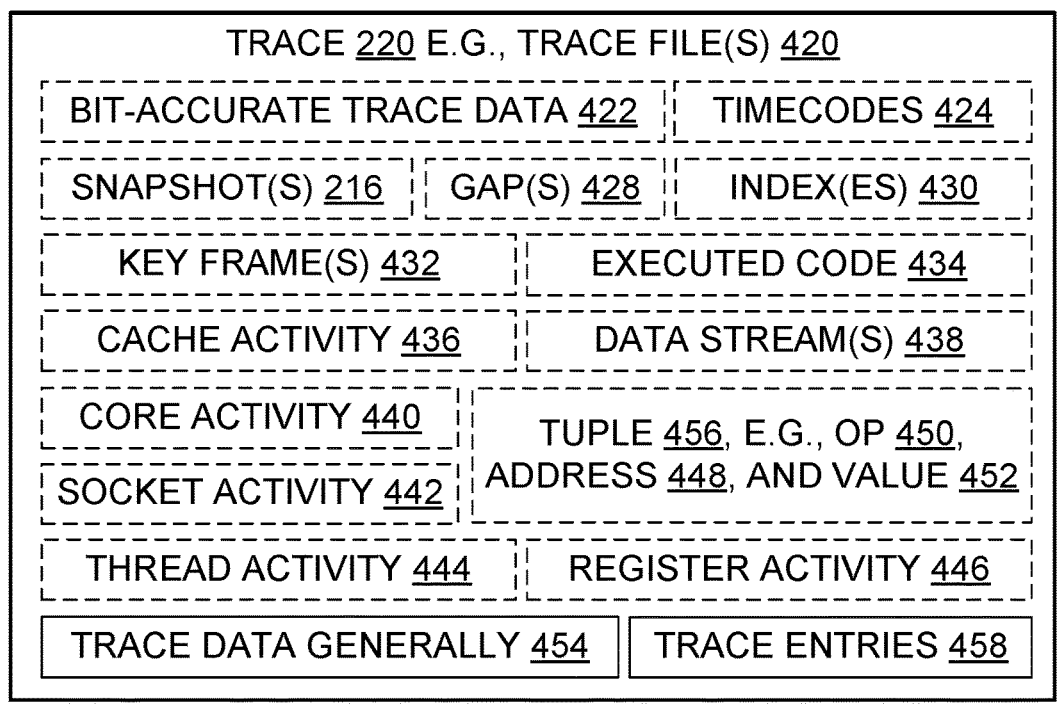
FIG. 4 is a block diagram illustrating aspects of execution traces.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor
112 computer-readable storage medium, e.g., RAM, hard disks
114 removable configured computer-readable storage medium
116 instructions executable with processor; may be on removable media or in other memory (volatile or non-volatile or both)
118 data
120 kernel(s), e.g., operating system(s), BIOS, device drivers
122 tools, e.g., anti-virus software, profilers, debuggers, execution tracers, editors, compilers, interpreters, security penetration testers, fuzzers, etc.; may be adapted to use selective tracing controls taught herein
124 applications, e.g., word processors, web browsers, spreadsheets
126 display screens
128 computing hardware not otherwise associated with a reference number 106, 108, 110, 112, 114
200 environment wherein managed code is traced, or traced and debugged
202 debugger
204 execution tracer
206 live debuggee program or process
208 managed code
210 runtime
212 memory items, e.g., application or system data structures
214 copy of some or all memory items
216 memory snapshot; may include additional information such as indexes or metadata
218 dump file, a.k.a. memory dump; may include additional information such as indexes or metadata 220 execution trace; although dashed lines in FIG. 4 show that individual items may be included in or omitted from a given trace, it is assumed herein that the trace is not empty and therefore the box for trace data generally 454 shows a solid line 300 environment wherein native code is traced, or traced and debugged 420 trace file containing execution trace data; may include machine-level trace data, namely, data which records execution activity at the level of assembly language or intermediate language or lower 422 bit-accurate trace data in a trace 424 timecodes in a trace identifying particular execution time points in the execution of traced code; may be linked to or embedded within other data inside a trace, e.g., in trace data that expressly states an execution time point associated with a stated operation at a stated memory address involving a stated data value; timecodes may be implemented, e.g., as clock ticks or instruction counters; some traces may contain a unique timecode for each recorded operation, but timecodes may also be repeated or omitted in some trace data 428 gap in timecodes in trace to indicate expressly or implicitly execution time points where tracing was not performed (e.g., ranges when tracing was disabled for a thread or processing unit). This may include any gap where adjacent timecodes differ by more than the default or specified increment (normally one), e.g., the timecode sequence 2, 3, 4, 300, 301, 302 has a gap between 4 and 300, and the timecode sequence 250, 500, 750, 1000, 2000, 2250, 2500 has a gap between 1000 and 2000.

430 index into data in trace file, e.g., reverse-lookup data structures for quickly identifying trace attributes, memory lifetime indexing information, and other searchable lists of locations in the trace data that may be of particular interest 432 key frames in trace data; e.g., may exist at regular intervals in trace data to permit replay to more quickly jump to replay of the trace at (or near) the key frame 434 executed code, e.g., opcodes and arguments of machine-level code of a debuggee that was executed by a processor as the debuggee ran and was being traced 436 stack activity that occurred as the debuggee ran and was being traced, e.g., stack growth, stack shrinkage, and the execution time points at which this activity occurred 438 data streams; may correspond to an individual thread or set of threads, may correspond to a processor unit (e.g., a processor core); may correspond to all cores in a given processor socket; may be annotated with metadata to aid replay 440 processor core activity that occurred as the debuggee ran and was being traced, e.g., opcodes and arguments of instructions executed by the core 442 processor socket activity that occurred as the debuggee ran and was being traced, e.g., opcodes and arguments of instructions executed by any core located in a given processor socket 444 thread activity that occurred as the debuggee ran and was being traced, e.g., instructions executed while the thread was running, memory cell accesses made while the thread was running, associated metadata such as thread ID and timecodes 446 register activity that occurred as the debuggee ran and was being traced, e.g., what value was read from which register at what timecode, what value was written to which register at what timecode 448 memory address 450 instruction op code 452 data value 454 trace data generally 456 tuple, namely, two or more items of trace data which are associated in the trace as representing the same operation during the traced execution; e.g., a memory read operation or a memory write operation may be recorded on a single line in a trace as a tuple which contains or otherwise associates together an op code (e.g., read or write), an address (e.g., a RAM address or register ID), and the data value that was read or written 458 trace entry 502 memory cell, e.g., byte or word in RAM or in ROM, processor register, cache line, or other addressable unit of memory 504 stack, e.g., a portion of memory where state information is pushed when a routine is entered and then popped as control returns from the routine to the code that called the routine; often distinguished from heap memory 506 stack base address which defines a starting point from which stack is allocated in contiguous pieces of memory; stacks are assumed to grow in a known direction by allocation of stack memory in a system, which may be an upward direction (i.e., addresses increase as items are pushed on the stack) in a given system but may also be downward (i.e., addresses decrease as items are pushed on the stack) in another system; the term "growthward" herein means in the direction of stack growth on the system in question, and "shrinkward" means in the opposite direction 508 stack frame, a.k.a. allocation record, which is allocated on the stack when a routine is called; typically contains a return address identifying a location in the code where execution will resume when the routine returns; may also hold values passed as parameters to the routine when the routine is called, or the address of such parameter values 510 heap memory which is allocated and deallocated as objects are constructed and freed; in some cases, a heap may be subject to automatic garbage collection, which identifies and marks as available memory that hold objects no longer reachable during live execution of a process; in other cases, memory allocated from a heap requires a separate, explicit call to free that allocated memory.

512 object 514 cache memory; may be in RAM working memory or onboard a processor chip, for example 516 register in a processor core 518 object property; a named value which is a constituent of an object; may be a function, in which case the property is often referred to as a method; also refers to a function that implements an object property; a function is a routine that returns a value 520 ROM (read-only memory); typically non-volatile 522 nonvolatile memory other than onboard ROM, such as removable flash memory, magnetic or optical disk storage, tape storage, etc.

524 RAM (random access memory); typically volatile 526 local memory, e.g., memory which is local to a stated or implied context such as local to a routine during the routine's execution and then freed, or local to a thread 528 global memory, e.g., memory which is global to a stated or implied context such as global to a set of multiple routines during the execution of any of them, or global to a set of threads 530 characteristic of memory which increases or decreases likelihood that an entity external to a thread will alter the value stored in the memory cell, e.g., whether the memory cell is write-protected with respect to other threads, whether it is in shared memory such as memory that is global to multiple threads 602 thread 604 thread ID 606 thread status, e.g., created, runnable, running, suspended, blocked, terminated 608 thread code, namely, code which executed or which may execute when a thread runs 610 thread memory, e.g., memory which is local to a thread, or memory that is global to the thread and is accessed by the thread as the thread executes 700 trace controller, a.k.a. tracing controller 702 portions of traced process designated to be traced 704 criteria designating portions to be traced or not traced 706 portions of traced process not designated to be traced, including those portions explicitly designated as do-not-trace and those portions implicitly designated do-not-trace because they are not expressly designated to be traced 708 library containing code other than user code that is being debugged, e.g., a standard library, or a library for which a different developer is responsible with respect to any debugging 710 compiler, e.g., JIT compiler 712 garbage collector, i.e., code which reclaims memory so that memory operations line malloc( ) and free( ) are not required in the user code source code 714 modifications to executable code to control tracing, e.g., calls to tracing enabler, calls to tracing disabler, calls to set or check tracing disablement distance variable 716 tracing disabler, namely, a routine whose invocation stops tracing 718 tracing enabler, namely, a routine whose invocation starts tracing 720 tracing disablement distance variable 722 stop-tracing value; when the tracing disablement distance variable reaches this value, the tracing disabler is invoked; it is expected the stop-tracing value will often be zero 724 tracing disablement distance variable modifier, e.g., an interrupt or hardware processor mode or circuit which automatically decrements a specified register (serving as a distance variable) as each program instruction is executed; although examples herein discuss decrementing a distance variable until it hits zero, one of skill will recognize that functionally equivalent implementations may increment a negative distance variable until it hits zero, or may increment or decrement a distance variable until it hits some other stop-tracing value upon which the trace controller triggers invocation of the trace disabler 726 high-count threshold for values in the distance variable, which can be used to indicate in a newly entered code unit that it is being traced 728 low-count threshold for values in the distance variable, which can be used to maintain tracing on state long after exiting a code unit that is being traced long enough to encounter an indication in the newly entered code unit that it is also being traced, if such an indication is present, and otherwise let the tracing be disabled unless control passes (back or down) to code designated to be traced 730 tracing state, i.e., tracing is in an enabled state, or tracing is in a disabled state 802 a variation of system 102 which lacks or does not utilize the distance variable aspects of trace controller 700 that limit invocations of the trace disabler and trace enabler as taught herein; instead, the variation explicitly invokes the trace enabler on entering each portion of code to trace and explicitly invokes the trace disabler on exiting each portion of code to trace 804 computational cost, measured e.g., in processor cycles, instruction count, or system clock elapsed time, or in terms of the number of trace 220 entries 458

806 computational cost of tracing at least specified portions of code using distance variable aspects of trace controller 700 that limit invocations of the trace disabler and trace enabler as taught herein 808 computational cost of tracing at least specified portions of code without using the distance variable aspects of trace controller 700 that limit invocations of the trace disabler and trace enabler as taught herein 902 set-N( ) routine in some implementations of trace controller, to set the value of local variable N 904 local-N, a parameter to the set-N( ) routine 906 get-N( ) routine in some implementations of trace controller, to get the value of local variable N 908 local variable N in some implementations of trace controller 910 set-DV( ) routine in some implementations of trace controller, to set the value of a tracing disablement distance variable 912 tracing-max, a parameter to the set-DV( ) routine 914 get-DV( ) routine in some implementations of trace controller, to get the value of a tracing disablement distance variable 916 try-to-trace( ) routine in some implementations of trace controller, to enable tracing if tracing is not already enabled 1000 tracing state diagram illustrating tracing control behavior in some implementations 1002 tracing on state, i.e., state in which tracing is enabled 1004 tracing off state, i.e., state in which tracing is disabled 1006 execute an instruction of traced process; may also refer to executing a larger part of the process, or all of the process 1008 call the try-to-trace( ) routine; 1008 also designates execution of the try-to-trace( ) routine 1010 call a trace enabler; also designates executing the trace enabler 1012 record execution info into a trace 1014 decrement a tracing disablement distance variable, or otherwise move the distance variable's value closer to a stop-tracing value 1016 call a trace disabler; also designates executing the trace disabler 1100 code unit 1102 function 1104 routine 1106 coroutine 1108 exception handler, a.k.a. exception catcher 1110 interrupt handler 1112 other code unit, e.g., block, loop body, set of various code units 1114 virtual method 1116 an implementation of a virtual method
1118 callback
1120 count-ensuring code, including code to ensure distance variable meets or exceeds a high-count threshold, or code to ensure distance variable does not exceed a low-count threshold
1122 library
1124 module, e.g., file, assembly, package
1200 aspects of code related to use of a tracing disablement distance variable to control which sections of a process are recorded into a trace
1202 entry point into a routine or other code unit
1204 exit point from a routine or other code unit
1206 caller to a routine
1208 current execution point in a routine or other code unit
1210 tuning conditions for adjusting a tradeoff when using a tracing disablement distance variable to control which sections of a process are recorded into a trace, e.g., adjusting how much uninteresting code is traced versus how many processor cycles are spent disabling tracing and re-enabling tracing; also refers to using such conditions to tune tracing thresholds 726, 728
1216 value of a tracing disablement distance variable; however, as is usual with developers, for convenience at times herein the value of a variable is indicated by simply referring to the variable rather than referring explicitly to the value of the variable, e.g., referring to variable N refers both to the variable (allocated and identified storage) and to the value held in that variable, and one of skill understands from context which reference is intended
1218 information about executable code costs, such as the average length (number of instructions/processor cycles) of an executable code's routines, the distribution of routine sizes, and other info as indicated herein
1220 information about computations cost of turning tracing on or turning tracing off, e.g., the length (number of instructions/processor cycles) of a trace enabler or a trace disabler
1300 computational cost comparison example
1400 method of configuring a system to control tracing by using a tracing disablement distance variable
1402 configure a system to control tracing by using a tracing disablement distance variable
1404 control tracing by using a tracing disablement distance variable
1406 use a tracing disablement distance variable
1408 embed a count ensuring code in a process
1410 high-count ensuring code
1412 a location in code
1414 low-count ensuring code
1416 associate a distance variable modifier with a process or its code
1418 instruction counter
1420 connect an execution tracer with a process or its code
1422 install a callback to pass control to an execution tracer
1424 configure a trace controller
1426 disable tracing, e.g., by involving trace disabler
1428 reach zero or other stop-tracing value due to value change in distance variable, e.g., due to decrementing distance variable
1430 enable tracing, e.g., by involving trace enabler
1500 method of controlling tracing by using a tracing disablement distance variable
1502 set distance variable to relatively high value
1504 set distance variable to relatively low nonzero value
1600 flowchart
1602 designate a code unit as a portion of a process (e.g., program) that is to be traced
1604 designate a code unit as a portion of a process (e.g., program) that is not to be traced, or as a portion that is not required (optionally included) in a trace
1606 confirm that a tracing disablement distance variable is not at the stop-tracing value, e.g., that the distance variable is nonzero
1608 measure computational cost, e.g., in processor cycles 1610, instruction count 1612, or system clock elapsed time 1614
1616 run (a.k.a. execute) managed code
1618 run (a.k.a. execute) native code
1620 use set-N( ), get-N( ), local variable N, or equivalent but differently named functionality, as part of tracing control
1622 use try-to-trace( ) or equivalent but differently named functionality, as part of tracing control
1624 use logical infinity as a relatively high value in a tracing disablement distance variable
1626 logical infinity, namely, a value LI which satisfies at least the following conditions: LI minus any other integer value equals LI, LI is further from zero than any other integer value
1628 use info 1218 about executable routine size when to controlling tracing
1630 select a low-count threshold
1632 select a high-count threshold
1634 satisfy a tuning condition 1210
1636 sample the execution of the process into a trace
1638 call a routine
1640 enter a routine
1642 exit a routine
1646 compile code
1648 redirect function call
1650 identify a routine or other code unit as one designated for tracing Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in dashed-line form in the Figures, or listed inside parentheses, to emphasize that they are not necessarily part of the illustrated operating environment or part of all embodiments, but may interoperate with items in the operating environment or some embodiments as discussed herein. It does not follow that items not in dashed-line or parenthetical form are necessarily required, in any Figure or any embodiment. In particular, FIG. 1 is provided for convenience; inclusion of an item in FIG. 1 does not imply that the item, or the described use of the item, was known prior to the current innovations.

Tracing Environments

FIGS. 2 and 3 each illustrate a live process environment; FIG. 2 shows managed code 208 whereas FIG. 3 shows native code 308. These environments 200, 300 were also discussed in some detail above. Of particular interest here are the tracer 204 and the trace 220 produced by the tracer 204. Tracer 204 and trace 220 may include familiar aspects, but they will also reflect and benefit from selective tracing innovations taught herein.

In each environment 200, 300, a tracer 204 is present. The tracer 204 is originally designed and implemented, or has been adapted, to perform selective tracing as taught herein. A debugger 202 may also be present in either or both environments 200, 300. If present, the debugger may be integrated with the tracer to perform tracing during debugging, or the debugger may merely be able to read a trace 220 created previously by the tracer.

Traces

As illustrated in FIG. 4, a trace 220 may be stored in one or more files 420, and may include various kinds of trace data as well as metadata which facilitates or delimits searches of the trace data. Part or all of a trace 220 may also reside in RAM. Some examples of trace data include bit-accurate trace data 422 such as copies of low-level instructions and their operands, timecodes 424 which can be used to order trace data items relative to one another, memory snapshots 216 or dumps 218, indexes 430 into the raw trace data, key frames 432 inserted into raw trace data at specified intervals, copies of code 434 executed by the debuggee during tracing, stack activity 436, data streams 438 read or written by the debuggee while tracing, processor activity on a per-core 440 or per-socket (multiple cores) 442 basis, thread activity 444 while tracing, register reads and writes 446 while tracing, tuples 456 correlating a memory address 448 with an instruction 450 and one or more values 452 and optionally also with a timecode 424, and other 454 reads or writes or values or opcodes captured in a trace. In some embodiments, an instance of any of the items 216, 422, 434, 436, 438, 440, 442, 444, 446, 456 qualifies as a trace "entry" 458. In some, any minimal portion of trace data 454 which by itself represents a state change of the traced program qualifies as a trace "entry" 458. The absence of certain data in a trace may also be considered state information, e.g., gaps 428 in a sequence of timecodes.

Some tracing processes only record two kinds of data. One kind of data recorded is the execution of code instructions 116 which are executed potentially on multiple threads in parallel. The other kind of data recorded is snapshots 216 of specific blocks of memory taken at discrete points in execution time, e.g., to capture a portion of the stack when selective recording is initiated. However, other tracing processes record different or additional kinds of data, as illustrated in FIG. 4. In some cases, a trace contains an efficient representation of all of the recorded instructions plus all of their inputs and their outputs. The recording of a trace 220 is made efficient by relying on the determinism of the processor(s) 110 and recording mainly the information that cannot be inferred based on that determinism plus what is already recorded in the trace 220. The majority of the trace 220 in some implementations is data, not executed code instructions; such data is often non-deterministic. A trace may be mainly seed data plus non-deterministic information. In some cases, only information that hits the traced processor(s) is recorded into the trace 220, e.g., a read of value V into a processor register is entered in the trace, but a write of value V from the register to a memory location X is not necessarily entered into the trace. If that write to X makes a difference in the traced program's behavior, it will be because the written value comes back from X into a processor register at some point, at which point an entry in the trace 220 can be made if tracing is still enabled.

Figure 5:
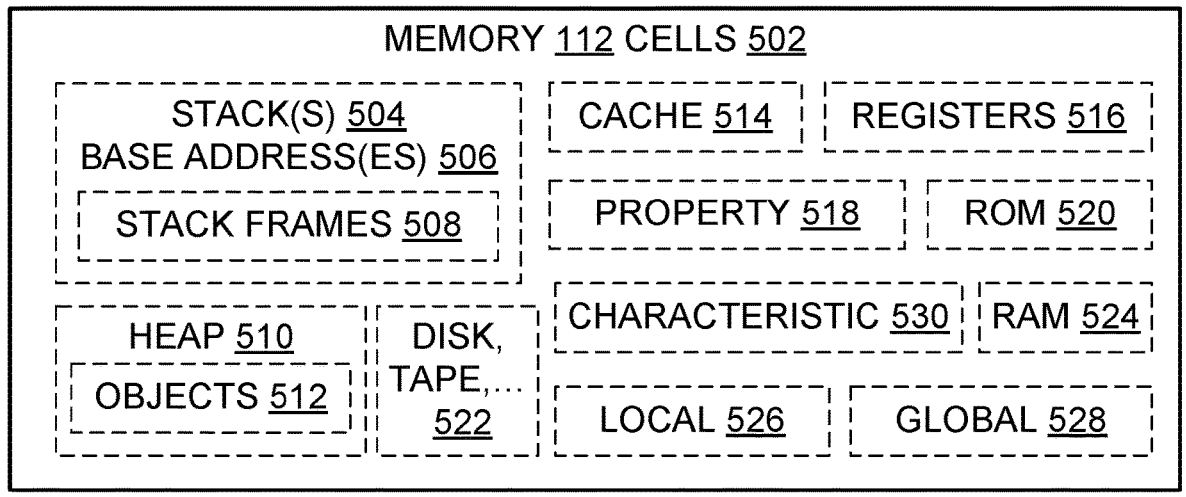
FIG. 5 is a block diagram illustrating some of kinds of memory cells that may be referenced in a trace.

FIG. 5 illustrates various kinds of memory 112 that may be traced, and thus be subject to inspection according to teachings herein. Examples of memory cells 502 shown include stacks 504 (including data such as their base address 506 and allocated stack frames 508), heap contents 510 such as objects 512 or metadata such as garbage collection data, caches 514, processor registers 516, object members such as properties 518, addressable cells in ROM 520 or in RAM 524, removable or third-tier memory 522, local memory 526, and global memory 528. A memory cell may have one or more characteristics 530 which increase or reduce the accessibility of the memory cell, e.g., memory may be in kernel space, may be shared, may be subject to DMA, and so on.

Figure 6:
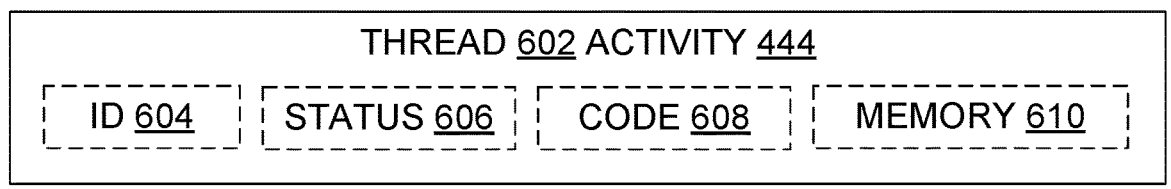
FIG. 6 is a block diagram illustrating aspects of thread trace data.

FIG. 6 shows thread 602 activity information 444 that may be captured in a given trace 220. Shown are a thread identifier 604, thread status indication 606, executable code 608 of the thread, and memory cell 502 state information 610 such as thread-local variables and their identifiers.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 7:
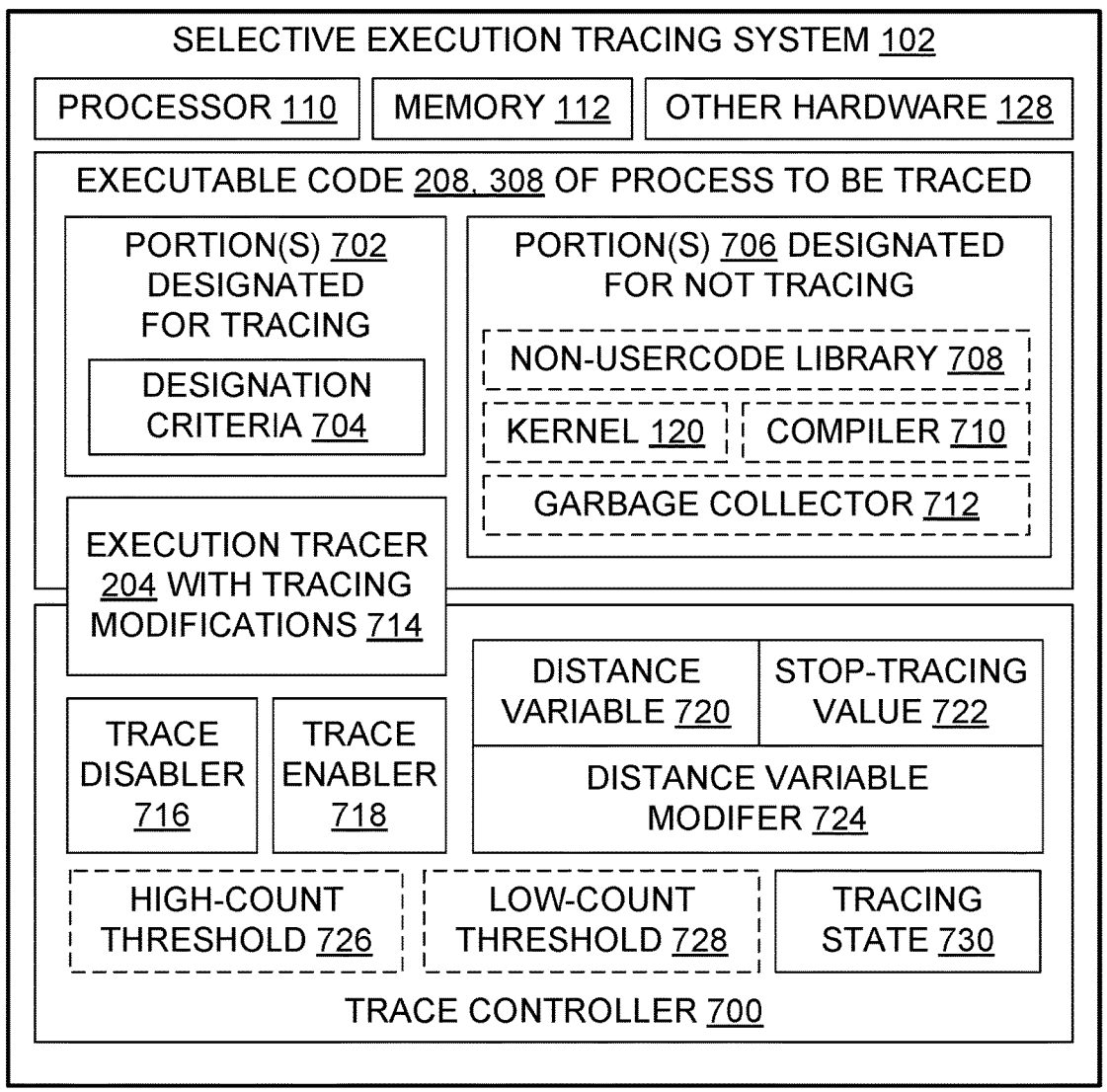
FIG. 7 is a block diagram illustrating aspects of a selective execution tracing system.

FIG. 7 illustrates a system 102 configured for selective tracing as taught herein. One or more portions 702 of code are designated for tracing, using one or more designation criteria 704. For instance, criteria 704 may include a list of file names, object names, method names, module names, routine names, or other identification of portions 702 that a developer wants included in the tracing. Criteria may also or alternatively include attributes or special instructions located within the process's code, which can be recognized by a runtime or a debugger during process execution and used to trigger tracing. "Inclusion in tracing" and similar phrases herein mean that tracing is or will be enabled while code in the designated portion executes. In particular, criteria 704 may designate "user code" so that execution traces are substantially limited to software that is considered "User Code", where "substantially" means that 90 percent (or another specific administer-selected value) of the traced code is user code. What qualifies as user code can be defined by the developer of the software that is being traced as a configured "inclusion list", defined as a set of modules, namespaces, or class names. It can also be determined automatically by exclusion of well-known standard libraries. Tracing is temporarily paused after a thread of execution exits "user code", and it resumes when user code is re-entered. Some embodiments support scoped execution tracing based on user configuration. A user can configure traces to be enabled during short periods of time, e.g., for the execution of a single function, the execution of a single web request, or execution between user-defined points in the process code.

Other portions 706 of the process may be implicitly or explicitly designated for exclusion from tracing. For example, a developer may set designation criteria 704 to exclude any or all of the following from tracing: non-usercode libraries 708 such as standard libraries or third-party libraries, kernel 120 code, compiler 710 code (including, e.g., pre-processors, compilers per se, assemblers, linkers, interpreters), or garbage collection code 712.

Unless stated otherwise, exclusion of portions 706 from tracing is a goal or preference but is not a requirement. That is, it is expected that many if not all implementations of the teachings herein will favor over-inclusion in a trace to under-inclusion. By design, these implementations will operate on the basis that it is better to include more tracing than was designated than it is to omit from the tracing something that was designated for tracing. However, teachings herein can also be applied in other implementations.

The illustrated system 102 includes a tracer 204 configured with a trace controller 700. Aspects of the tracer 204 may be familiar, while other aspects include or use selective tracing modifications 714. Familiar tracers may have a trace enabler 718, a trace disabler 716, and a tracing state 730, for instance, although they are not previously used according to the teachings herein for selective tracing. Some examples of innovative selective tracing modifications 714 that may be included in or utilized by a trace controller 700 include a distance variable 720 coordinated with a distance variable modifier 724 and stop-tracing value 722, thresholds 726 and 728, code which has routines that are functionally equivalent to those described in connection with FIG. 9, code which changes tracing state 730 as described in connection with FIG. 10, count-ensuring code 1120, code which implements one or more tuning conditions 1210, and code which operates as described in connection with one or more of FIGS. 13-16.

In particular, selective tracing modifications 714 include or use a distance variable 720. There may be a single distance variable in a traced process, or multiple distance variables, e.g., one per thread. For clarity, the discussion herein assumes a single distance variable per process, but one of skill will readily apply the teachings when implementing selective tracing with two or more distance variables which can independently disable tracing. One of skill will also understand that a distance variable can be given various names in a given implementation. It is denoted a "distance variable" here merely as a reminder of one view of its use: one way of describing a suitable use is to interpret the distance variable as a measure of the computational distance from an operation which will turn off tracing. The larger the value is in the distance variable, the more tracing will be done, and conversely, when the distance variable reaches zero (or some other stop-tracing value 722), tracing will be disabled.

Figure 8:
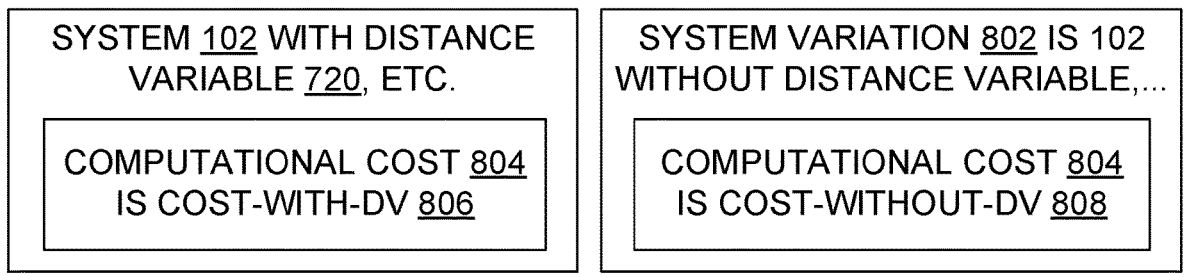
FIG. 8 is a block diagram illustrating aspects of a computational cost advantage of tracing with a tracing disablement distance variable versus tracing without such a distance variable.

FIG. 8 illustrates two contrasting systems, in order to highlight computational advantages of innovations described herein. On the left is a system 102 configured with a distance variable 720, and on the right is a variation 802 which lacks the distance variable and other selective tracing modifications 714. In each system, tracing is performed on at least the designated portions 702 of a process 206. In each case, the tracing has an associated computational cost 804, e.g., the number of processor cycles performed. As illustrated by the example in FIG. 13, the computational cost 806 of tracing in a system with a distance variable will tend to be less than the computational cost 808 of a system 802 without the distance variable and other selective tracing modifications 714, because there will tend to be fewer calls to enable tracing and fewer calls to disable tracing. One tradeoff is that traces 220 will tend to be larger when the selective tracing modifications 714 are used than when they are not. However, by setting thresholds 726, 728, control over the size of the trace can be exerted to balance increases in trace size against decreases in tracing computational cost.

Figure 9:
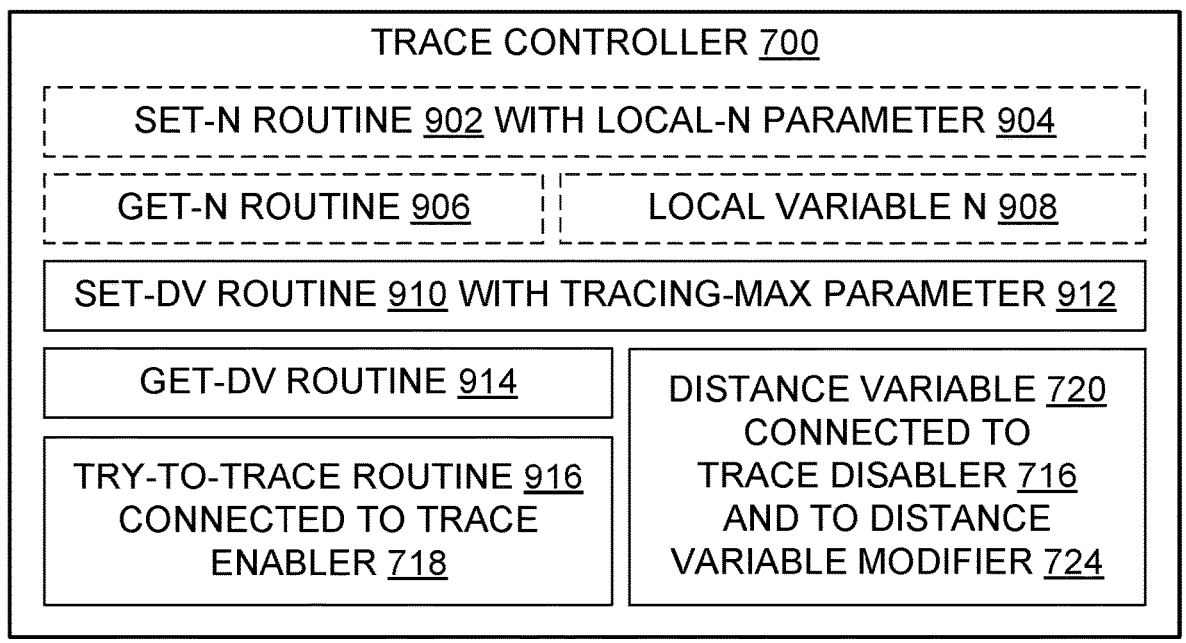
FIG. 9 is a block diagram illustrating aspects of a trace controller which controls execution tracing using a tracing disablement distance variable.

FIG. 9 shows a particular design of a trace controller 700, with the understanding that other designs may also utilize teachings presented herein and operate according to the various methods shown in FIGS. 10, 13-16. The routines and parameters shown in FIG. 9 are generalizations of a particular implementation example. This particular implementation example includes a selective tracing interface 714 with the functions described below, running over an underlying execution tracing technology 204. The underlying tracing technology 204 may provide, for instance, Event Tracing for Windows (ETW) tracing (a.k.a. "Time Travel Tracing" or known as part of "Time Travel Debugging") on systems running Microsoft Windows® environments (mark of Microsoft Corporation), LTTng® tracing on systems running a Linux® environment (marks of Efficios Inc. and Linus Torvalds, respectively), DTrace® tracing for UNIX®-like environments (marks of Oracle America, Inc. and X/Open Company Ltd. Corp., respectively), and other tracing technologies 204.

The trace control functions in this example include the following.

SetThreadInstructionsToRecord (threadInstructions): Caches a global number of instructions that should be recorded on a thread. This cache is thread local, and has no direct impact on recording. The value of threadInstructions can be logically infinite.

GetThreadInstructionsToRecord( ): Returns the value cached by SetThreadInstructionsToRecord( ).

SetMaxInstructionsToRecord (maxInstructions): Instructs the underlying tracing technology to stop recording after maxInstructions instructions have been executed in the current thread.

GetRemainingInstructionsToRecord( ): Returns the number of instructions that will be recorded on the current thread by the underlying tracing technology before recording will be stopped.

TryStartRecordingCurrentThread( ): Instructs the underlying tracing technology to start recording execution of the current thread, if it is not already recording.

In this example, configuration info 704 is supplied to the system 102 designating which functions in a process are considered "user code". Specifically, in this example the user code is designated for tracing, and all code of the process that is not expressly designated for tracing is implicitly designated as being not for tracing.

In operation according to this example, each routine that is to be considered "user code" is decoded at execution time. At a convenient early execution point of a thread, SetThreadInstructionsToRecord (threadInstructions) is called with a sufficiently large number threadInstructions. What constitutes early, convenient, sufficiently large, sufficiently small, and similar characteristics referenced herein may be determined by an administrator 104 in view of the tradeoff between trace size and computational cost noted above, and the capabilities of the decoding, injection, and recording technology 204.

At each entry point 1202 of the function (the beginning of the function, return points from calls, catch handlers, etc.) code is inserted 1408 to:
Call SetMaxInstructionsToRecord (GetThreadInstructionsToRecord( ), and Call CallTryStartRecordingCurrentThread( ).

Before each exit point 1204 of the function (return, function call, exception throw, etc.) code is inserted 1408 to:
Call SetThreadInstructionsToRecord (GetThreadInstructionsToRecord( )—GetRemainingInstructionsToRecord( ), and
Call SetMaxInstructionsToRecord(e) where e is some sufficiently small number.

Note that a call may cache a value designating infinity, e.g., if GetThreadInstructionsToRecord( ) returns a logically infinite number.

Each newly instrumented function is recompiled 1646 to machine-executable binary code. Calls to the user code functions are redirected 1648 to execute the newly compiled executable code.

When the resulting code is executed, the distance from a stop-recording event or call 716 varies as the distance variable maxInstructions changes value. On entry to a designated portion 702, the distance is increased, then on exiting it is decreased. If the exit passes control to another designated portion, the distance increases again. If exiting does not pass control to another designated portion, then one of two things tends to happen (ignoring for simplicity in this example the possibility of another call within the call).

One possibility is that the entered portion 706 which is not designated for tracing may be small enough (few enough instructions) that control is passed back to the designated portion before maxInstructions hits zero and turns off tracing; upon re-entering the designated portion, maxInstructions will be increased again. In this case, the extra tracing (that is, the tracing of code that was not designated for tracing) will include the traversal of the entered portion 706 that is not designated for tracing.

Another possibility is that the entered portion 706 which is not designated for tracing is large enough for maxInstructions do keep running down until it hits zero. If that happens while control is still in the entered portion 706, when maxInstructions hits zero the trace controller 700 turns off tracing. In this case, the extra tracing will include a record of traversal of an initial part of the entered portion 706 but not all of it.

Control may eventually return to another designated portion 702, in which case tracing will be enabled again and maxInstructions will be given a relatively large value, although not necessarily the same large value it was given last time. Or the process may finish or be terminated without control passing again to another designated portion 702, in which case tracing will remain off, or at least will not be re-enabled by the selective tracing mechanism 700. Some other mechanism could re-enable tracing, although it would be prudent in that circumstance to coordinate the other mechanism with the trace controller 700 to avoid unexpected or undesirable impact on the trace 220.

With the foregoing in mind, and renewed attention to FIG. 9, the SetThreadInstructionsToRecord( ) routine is an example of a set-N routine 902, the parameter threadInstructions is an example of a local-N parameter 904, and the thread cache variable is an example of a local variable N 908. The GetThreadInstructionsToRecord( ) routine is an example of a get-N routine 906. The SetMaxInstructionsToRecord( ) routine is an example of a set-DV routine 910, and its parameter maxInstructions is an example of a tracing-max parameter 912. The GetRemainingInstructionsToRecord( ) routine is an example of a get-DV routine 914. The TryStartRecordingCurrentThread( ) routine is an example of a try-to-trace routine 916. The generalization items 902-916 are provided here in addition to the specific examples already given, in order to emphasize that the teachings provided herein are not limited to any particular naming convention, capitalization scheme, programming language, operating system, API, or other implementation particularity.

FIG. 10 shows a tracing state diagram 1000 which illustrates operation of some embodiments. The tracing state diagram 1000 illustrates tracing in the context of a given thread, with the understanding that teachings herein may apply to environments having only a single thread and in multi-thread environments. Instances of the FIG. 10 state machine can be used independently across threads with respective thread-local distance variables DV. As shown near the center of the right side of FIG. 10, execution of a process 206 that will be traced starts with tracing in an off state 1004, which may also be referred to as a tracing disabled state or a not-tracing state or a not-recording state, for instance. One or more instructions 116 of the process execute 1006 without any change in tracing state. At some point, in this example, after executing 1006 one or more instructions the execution of the process reaches a try-to-trace( ) routine 916. Execution 1008 of the try-to-trace( ) routine 916 determines that the distance variable 720, which is also designated in the Figures as "DV", equals zero. Zero is the stop-tracing value 722 in this example. So the try-to-trace( ) routine sets the distance variable to a nonzero value, and calls 1010 a trace-on routine( ) which implements or calls the trace enabler 718 in this example. As shown in FIG. 10, the tracing state 730 then transitions to a tracing on state 1002, which may also be referred to as a tracing enabled state or a recording state, for instance.

Control is passed to an execute-record-decrement-test loop shown in the upper left portion of FIG. 10. One or more instructions 116 of the process execute 1006, and corresponding recording 1012 is performed using the underlying tracing technology 204. The correspondence between an individual instruction 116 and an entry in the trace 220 may be one-to-one, or not. For instance, the tracing technology 204 may perform sampling 1636 by recording every M instructions, where integer M>1 is a previously specified sampling period. The sampling period M was set by an administrator 104 or set by a default or a configuration parameter of the underlying tracing technology 204, for example. As the recording 1012 is performed, corresponding reductions in the distance to recording disablement are made by decrementing 1014 the distance variable. If the distance variable hits zero, tracing state transitions back to the tracing off state 1004 and the trace disabler 716 is called 1016. If the process ends, either normally or by being terminated, the tracing state 730 remains as whatever it was when the process ended.

When tracing is on, the process may encounter a try-to-trace( ) call. As shown in the lower left portion of FIG. 10, in this state 1002 an execution 1008 of try-to-trace( ) will determine that the distance variable is nonzero and will therefore not change the distance variable. Control will return to the execute-record-decrement-test loop shown in the upper left portion of FIG. 10, which executes 1006 part of the process, records 1012 corresponding trace data, decrements 1014 the distance variable, and tests the distance variable to see whether it has reached the stop-tracing value (zero in this example).

As illustrated in FIG. 7, some portions 702 of a process's code may be designated to be traced, and other portions 706 may be implicitly or explicitly designated as not currently of interest and thus not to be traced, except perhaps incidentally as a by-product of distance variable 720 usage. The portions 702, 706 may be code units, such as threads, libraries, or the like. That is, tracing designations 704 may implicitly or explicitly apply to portions 702, 706 whose boundaries are the boundaries of certain code units 1100, some of which are shown in FIG. 11.

Figure 11:
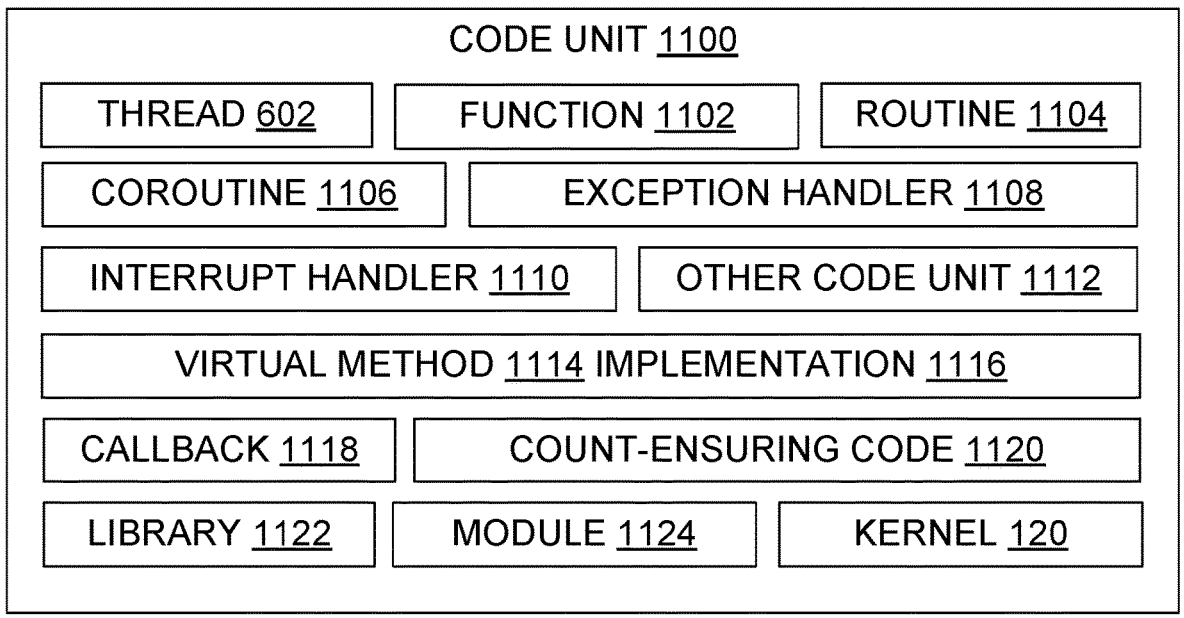
FIG. 11 is a block diagram illustrating some of the various kinds of code units that may be traced, and associated items.

As illustrated in FIG. 11, a code unit 1100 may be one or more of the following, or be a collection of one or more of the following: a thread 602, a function 1102 or other routine 1104, a coroutine 1106, an exception handler 1108, an interrupt handler 1110, an implementation 1116 of a virtual method 1114, a callback 1118, a library 1122, a module 1124, or another code unit 1112. An entire kernel 120 may be a code unit, so far as tracing is concerned.

A count-ensuring code 1120 is also shown in FIG. 11, but this is for convenience and completeness when listing ways code may be categorized. The count-ensuring code 1120 includes code such as a set-DV routine 910, which exists to implement tracing control, as opposed to being part of the process before injection of tracing modifications 714.

Figure 12:
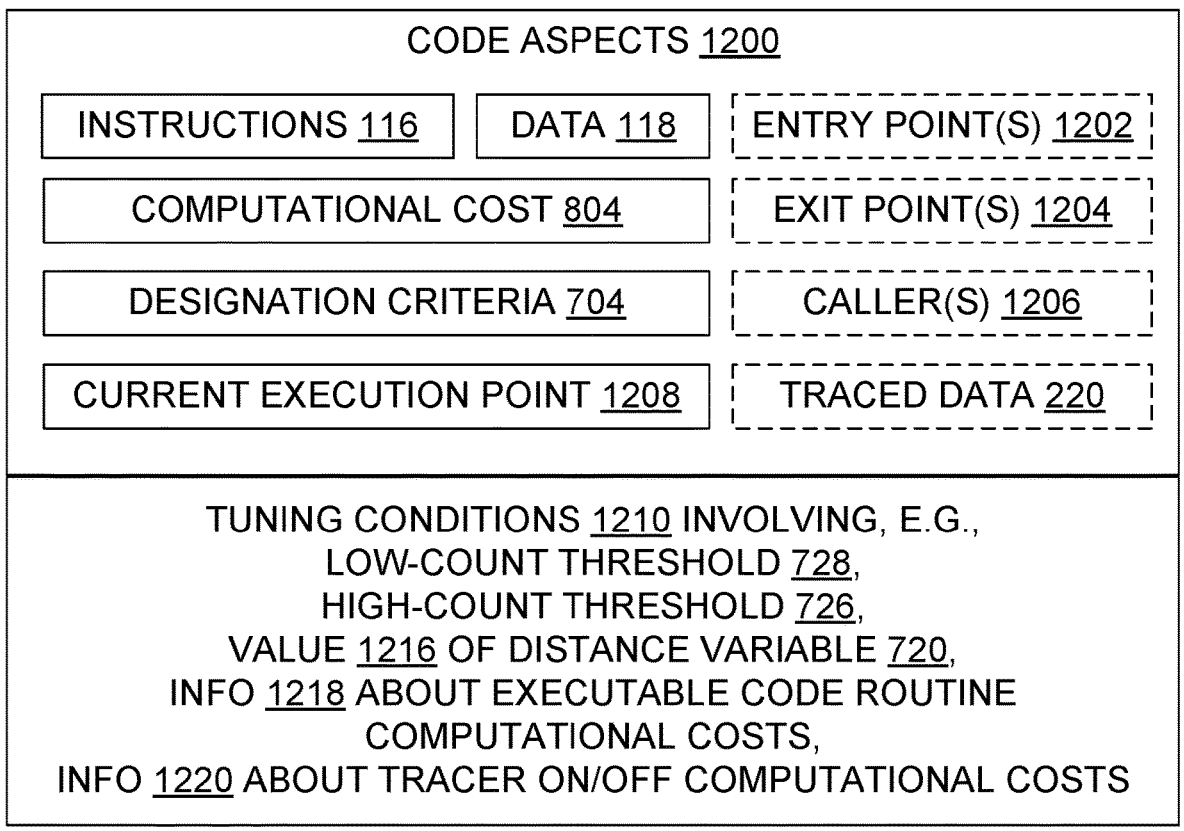
FIG. 12 is a block diagram illustrating some of the aspects of code that may pertain to tracing, and some tuning conditions that may be employed when tracing code under control of a tracing disablement distance variable.

FIG. 12 shows some of the aspects 1200 of process code which may be of interest in discussions of selective tracing. Process 206 code includes instructions 116 and data 118. The process likely includes routines 1104 and other code units 1100 which have one or more entry points 1202 at which control may enter 1640 the code unit and one or more exit points 1204 at which control may exit 1642 the code unit. Control may enter 1640 a code unit, for instance, at the top of a routine 1104 after the routine is called 1638 by a caller 1206, and may exit 1642 the routine after reaching the end of the routine or when calling 1638 another routine. "Control" refers to a current execution point 1208, that is, a point in the execution of the process 206 that indicates to one of skill or to the system or both at least one of the following: what instruction most recently finished execution, what instruction is currently executing, and what instruction will execute next. A control point may be recorded by recording an execution time point as a time code 424 with its context such as the current thread ID 604, for example.

FIG. 12 also shows some items that influence or determine one or more tuning conditions 1210. Tuning conditions represent and implement a balance of the computational cost 804 of tracing, the size of a trace 220, and the designations 704 as to what the developer wants traced or wants not traced. Tuning conditions 1210 may be set by an administrator or by default, for example. They may be determined on the basis of experimental data, such as profile information that provides computational costs, or static analysis data that provides statistics about the length and length distribution of routines. Tuning conditions 1210 may be constant throughout a particular execution of the traced process, or varied. Items involved in tuning the selective tracing of an execution of a process may include one or more of the following: a low-count threshold 728 for the distance variable's values, a high-count threshold 726 for the distance variable's values, current value 1216 of the distance variable 720, information 1218 about the computational costs of routines and other code units 1100 in the traced process, and information 1220 about the computational cost of turning tracing off or turning tracing on.

As further illustration of tuning 1210 the thresholds 726, 728, consider the following. Assume that the computational cost 804, 1220 of stopping tracing to not record a particular function, and then and then restarting later, is the equivalent of recording 1000 instructions. The instruction count distribution of the function the developer does not want to record is also a consideration. For example, suppose that 90% of the functions the developer would exclude from recording take 100 instructions or less to record. Tuning may ask whether it makes sense in terms of computational costs to set the low threshold 728 (or another count of instructions before auto-stopping the recording) to 101 instead of to 1. In some architectures it may not be possible to set this number below a threshold if the marker to continue recording must be after the function prolog, so at the very least low would have to be high enough to fit any function prolog plus the call to continue recording to avoid stopping the recording before the instrumentation has had an opportunity to tell the framework to keep going (setting it back to high). Those architectures aside, recording the 90% of functions that the developer actually wanted to exclude is computationally cheaper than excluding them all. So relevant tuning information 1218 includes the likelihood that a function designated for exclusion would be cheaper to record than to exclude, and that information can be used to reduce or minimize the overhead of recording.

In the context, of this tuning discussion, an estimate of the cost of making low 101 is an average cost per function of (100*0.9+1101*0.1) equals 200.1 instructions per function. The number is actually lower if any of the functions recorded that were designated for exclusion have less than 100 instructions (which seems likely). The actual number is the average instruction count recorded per function designated for exclusion, while the cost of low being 1 is 1001 instructions per function. So using the probability 1218 of the functions designated for exclusion being below a given number supports choosing low to be an optimal number.

Suppose that after the number was set to 101, an embodiment discovers that actually 89% of the functions fit in 80 instructions. Then the embodiment could dynamically adjust low to be 81 (which is actually a better choice with that data). Growing the number of instructions dynamically can also be done, for example if an embodiment observes that the recording stops at the epilog of the function for 3% of the functions (30% of the ones it is not recording), the embodiment can increase the low value to finish with those.

The distribution of probabilities 1218 can be gathered in multiple ways. Previous executions in the same recording session is one way. Other sources of tuning information may be available in the form of general statistical information of instruction distribution across functions in the industry, in the codebase, or from previous recordings in the area.

With reference to FIGS. 1-12, some embodiments use or provide a selective execution tracing system, including at least one processor 110, and a digital memory 112 in operable communication with the processor. An executable code 208, 308 is configured to upon execution perform a computer-implemented process 206. The executable code has multiple portions 702 which are designated for tracing, and multiple other portions 706 which are not designated for tracing. The system also includes an execution tracer 204, with a trace disabler 716 configured to upon execution disable tracing by the execution tracer, and a trace enabler 718 configured to upon execution enable tracing by the execution tracer. The system also includes a trace controller 700. The trace controller 700 includes a distance variable 720 which has values that indicate a current computation distance from execution of the trace disabler. The trace controller 700 is configured to upon execution invoke the trace disabler in conjunction with the distance variable having a stop-tracing value 722 and to subsequently invoke the trace enabler in conjunction with the distance variable not having the stop-tracing value. A distance variable modifier 724 of the system is configured to incrementally move the distance variable 720 closer to the stop-tracing value as the executable code of the process 206 executes.

In some embodiments, the system is further characterized in that a cost-with-distance-variable 806 of the system is less than a cost-without-distance-variable 808 of the system. The cost-with-distance-variable 806 is a total computational cost 804 of executing the executable code configured with the trace controller 700, including executing an initial invocation of the trace enabler 718, executing modifications 714 of the distance variable, executing one or more invocations of the trace disabler 716 when the distance variable reaches a stop-tracing value 722 and executing any subsequent invocations of the trace enabler, and including the computational cost of tracing when tracing is enabled. The cost-without-distance-variable 808 is a total computational cost 804 of executing a variation of the executable code 208, 308 that is configured without the trace controller 700, in which the distance variable 720 is not used, in which the trace enabler 718 is invoked with each entry to an executable code portion which is designated for tracing, and the trace disabler 716 is invoked with each exit from an executable code portion which is designated for tracing, and including the computational cost of tracing when tracing is enabled. The computational costs 806 and 808 are measured by at least one of the following: total number of instructions executed, total number of processor cycles performed, total system clock time elapsed, number of trace 220 entries 458.

In some embodiments, the portions 702 of the executable code which are designated for tracing include managed code 208, namely, code that is configured to run under the control of a runtime 210 which implements memory garbage collection or code compilation or both. In some embodiments, at least one portion 702 of the executable code which is designated for tracing consists of native code 308, namely, code that is configured to run without a runtime 210 which implements memory garbage collection or code compilation.

In some embodiments, a trace controller 700 includes the following: a set-N routine 902 which has a local-n parameter 904 and which is configured to upon execution set a thread local variable 908, denoted here as N, to the value of the parameter local-n; a get-N routine 906 which is configured to upon execution return the current value of the thread local variable N; a set-DV routine 910 which has a tracing-max parameter 912 and which is configured to upon execution set the distance variable 720 to the value of the parameter tracing-max; a get-DV routine 914 which is configured to upon execution return the current value of the distance variable 720; and a try-to-trace routine 916 which is configured to upon execution enable tracing of a current thread 602 by the execution tracer 204, if tracing is not already enabled.

In some embodiments, the distance variable 720 represents a maximum number of instructions 116 to trace, and the distance variable modifier 724 is configured to decrement the distance variable as the executable code executes. In addition, the trace controller 700 is configured to upon execution invoke the trace disabler 716 in conjunction with the distance variable reaching zero as the stop-tracing value 722 and to subsequently invoke the trace enabler 718 in conjunction with the distance variable being positive. The executable code of the process being traced is configured (e.g., by injection of tracing modifications 714) to upon execution perform at least one of the following to ensure that the distance variable does not equal the stop-tracing value upon entry to any executable code portion which is designated for tracing: confirm that the distance variable is nonzero, or set the distance variable to a positive high-count threshold 726.

In some of these embodiments, the high-count threshold 726 satisfies at least one of the following criteria: the high-count threshold indicates logical infinity, the high-count threshold exceeds the number of instructions in any code unit 1100, 702 of the executable code which is designated for tracing, the high-count threshold exceeds the number of instructions in any routine 1104, 702 of the executable code which is designated for tracing, the high-count threshold exceeds the number of instructions in ninety percent of the routines 1104 of the executable code, the high-count threshold exceeds the average number of instructions in routines 1104 of the executable code. The number of instructions in a specified percent of the routines, and the average number of instructions in routines, are each an example of information 1218 about code computational cost.

In some embodiments, a trace controller 700 includes an outer high-count-ensuring code 1120 in the executable code at an entry point 1202 of a code unit 1100. The high-count-ensuring code is configured to upon execution set the distance variable 720 to a value which is not less than the high-count threshold 726. The code unit includes at least one of the following: a thread 602, a function 1102, a routine 1104, a coroutine 1106, an exception handler 1108, or an interrupt handler 1110. In some of these embodiments, a trace controller 700 includes a low-count-ensuring code 1120 in the executable code prior to a call made to a virtual method 1114 within the code unit. The low-count-ensuring code is configured to upon execution set the distance variable 720 to a nonzero value which is not greater than a nonzero low-count threshold 728, the low-count threshold being less than the high-count threshold. An inner high-count-ensuring code 1120 in the executable code in a first implementation 1116 of the virtual method is configured to upon execution set the distance variable to a value which is not less than the high-count threshold, and a second implementation 1116 of the virtual method is free of any code setting the distance variable. Thus, one or more implementations of a virtual method 1114 may be traced whereas one or more other implementations of that virtual method are not traced, or at least not designated to be traced.

In some embodiments, the trace controller 700 includes a high-count-ensuring code 1120 in an exception handler 1108. The high-count-ensuring code is configured to upon execution set the distance variable to a value which is not less than the high-count threshold 726. Thus, continued tracing while handling an exception may be ensured without incurring the computational cost of calling and executing the trace enabler 718 inside the exception handler. Instead, tracing is continued by setting the distance variable sufficiently high to trace the desired portion (typically all) of the exception handler 1108.

One of skill will appreciate that other systems are also within the scope of the teachings presented here. In particular, other systems may use trace controller code which performs selective tracing, in some cases without using the particular APIs, variables, thresholds, trace file content, or designation criteria in examples recited herein. Systems or apparatus using any aspects or implementations of the selective tracing teachings provided are within the scope of the present disclosure, regardless of whether they are among the examples herein. Any claim consistent with the following is understood to be among the claims taught herein: A selective tracing system including tracing modifications or other trace controller code which is configured to upon execution with a processor perform selective tracing operations which replace or reduce invocations of a trace disabler by use of a distance variable as taught herein.

FIG. 13 shows a cost comparison 1300 which is one of many possible examples of replacing or reducing invocations of a trace disabler by use of a distance variable. With the distance variable, indicated by "DV", only one trace enabler call and one trace disabler call are used to trace routines A and C2, as shown on the left side of FIG. 13. Without the distance variable, four trace enabler calls and four trace disabler calls are used to trace the same routines A and C2, as shown on the right side of FIG. 13.

Methods

Methods involving the selective tracing tools and techniques taught herein can be divided into two distinct but closely related categories: methods that configure a system for selective tracing, and methods that perform selective tracing in a suitably configured system. Each kind of method is discussed below, and elsewhere herein, e.g., in connection with FIGS. 9, 10, and 13.

Figure 14:
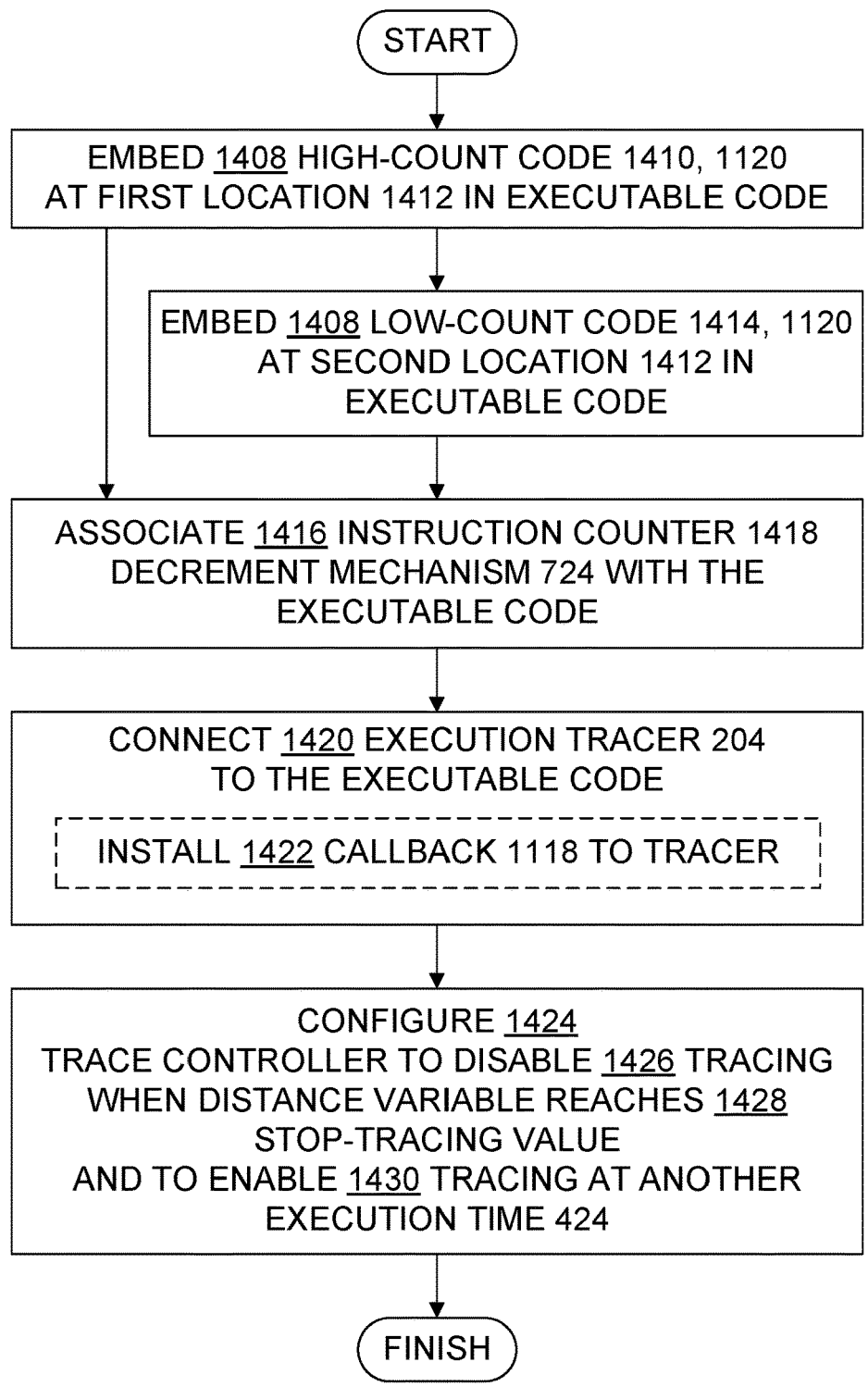
FIG. 14 is a flowchart illustrating an example method for configuring a system for selective execution tracing using a tracing disablement distance variable.

FIG. 14 is a flowchart illustrating an example of the selective tracing configuration method 1400 category. This method configures 1402 a system 102 for selective tracing. That is, the method 1400 configures a system 102 to control 1404 tracing 1012 by using 1406 a distance variable 720 and other tracing modifications 714, e.g., stop-tracing value 722, distance variable modifier 724, thresholds 726, 728, and routines to set and test the distance variable and enable or disable tracing according to the distance variable's value. These may include, for example, the set-DV routine 910, get-DV routine 914, and try-to-trace routine 916.

The illustrated method 1400 embeds (a.k.a. "inserts" or "injects") a high-count ensuring code 1410 at a first location 1412 in the process's code 208, 308. This high-count ensuring code 1410 is illustrated in FIG. 13 as "DV=HIGH" after the TRACE-ON( ) call, and is illustrated in the FIG. 9 discussion as a call to SetThreadInstructionsToRecord (threadInstructions) with a relatively large value for threadInstructions. In some but not necessarily all instances, the method 1400 also embeds 1408 a low-count ensuring code 1414 at a second location 1412 in the process's code 208, 308. This low-count ensuring code 1414 is illustrated in FIG. 13 as "DV=LOW" before the call that enters B1, and is illustrated in the FIG. 9 discussion as a call SetMaxInstructionsToRecord(e) where e is a relatively small number.

As an aside, some embodiments make tracing decisions at process runtime via code injection. One technical result of this is that the same code and binaries can be used for recording during development and in production without requiring any changes to source code to permit tracing.

The illustrated method 1400 associates 1416 the process's code 208, 308 with an instruction counter 1418 or other hardware 128 or combination of hardware clock or register or circuit with decrementing software. Thus, as discussed for example in connection with the FIG. 10 execute-record-decrement-test loop, the distance variable is automatically modified by being brought closer to the stop-tracing value as the process code executes. FIG. 13 does not explicitly recite decrementing DV, to avoid the decrease in the FIG. 13 legibility that recitation would bring. Instead, it is understood that DV decrements as code executes.

The illustrated method 1400 connects 1420 an execution tracer 204 to the executable code. This may be accomplished using familiar methods to connect ETW tools, LTTng® tools (mark of Efficios Inc.), DTrace® tools (mark of Oracle America, Inc.) or other familiar tracing capabilities, for example. Some embodiments also install 1422 a callback 1118 to the tracer 204, e.g., as part of a try-to-trace( ) routine 916 implementation.

The illustrated method 1400 configures 1424 a trace controller 700 to disable 1426 tracing when the distance variable reaches 1428 the stop-tracing value and to enable 1430 tracing at another execution time. This step may be accomplished, e.g., by inserting code which configures the process to perform state 730 transitions and otherwise operate as illustrated in FIG. 10. FIG. 13 and the discussion of FIG. 9 provide additional examples of configuring 1424 a system to make the enabling and disabling of tracing happen in conjunction with the status (stop-tracing value or not) of the distance variable 720.

Figure 15:
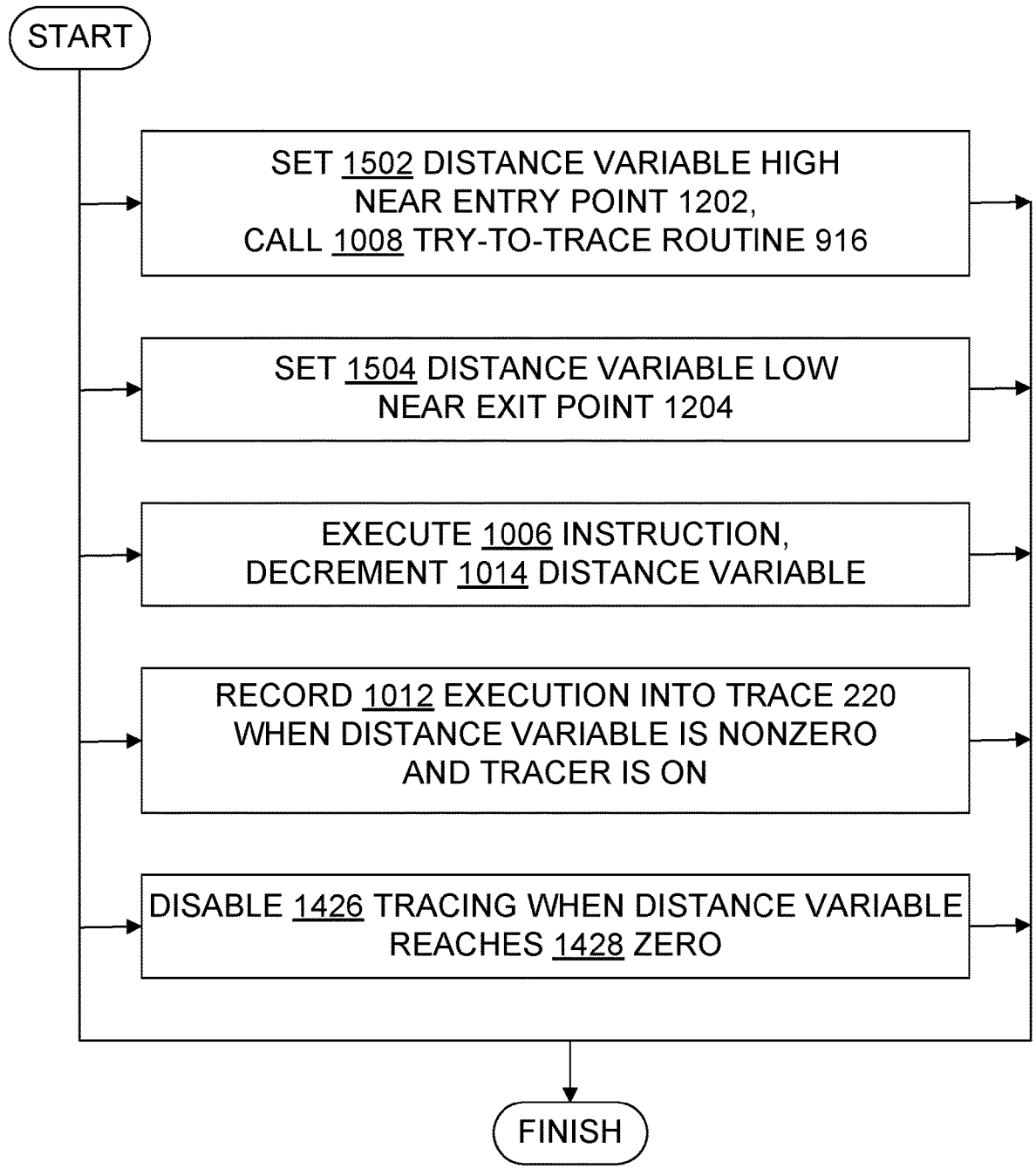
FIG. 15 is a flowchart illustrating an example method for selective execution tracing using a tracing disablement distance variable.
Figure 16:
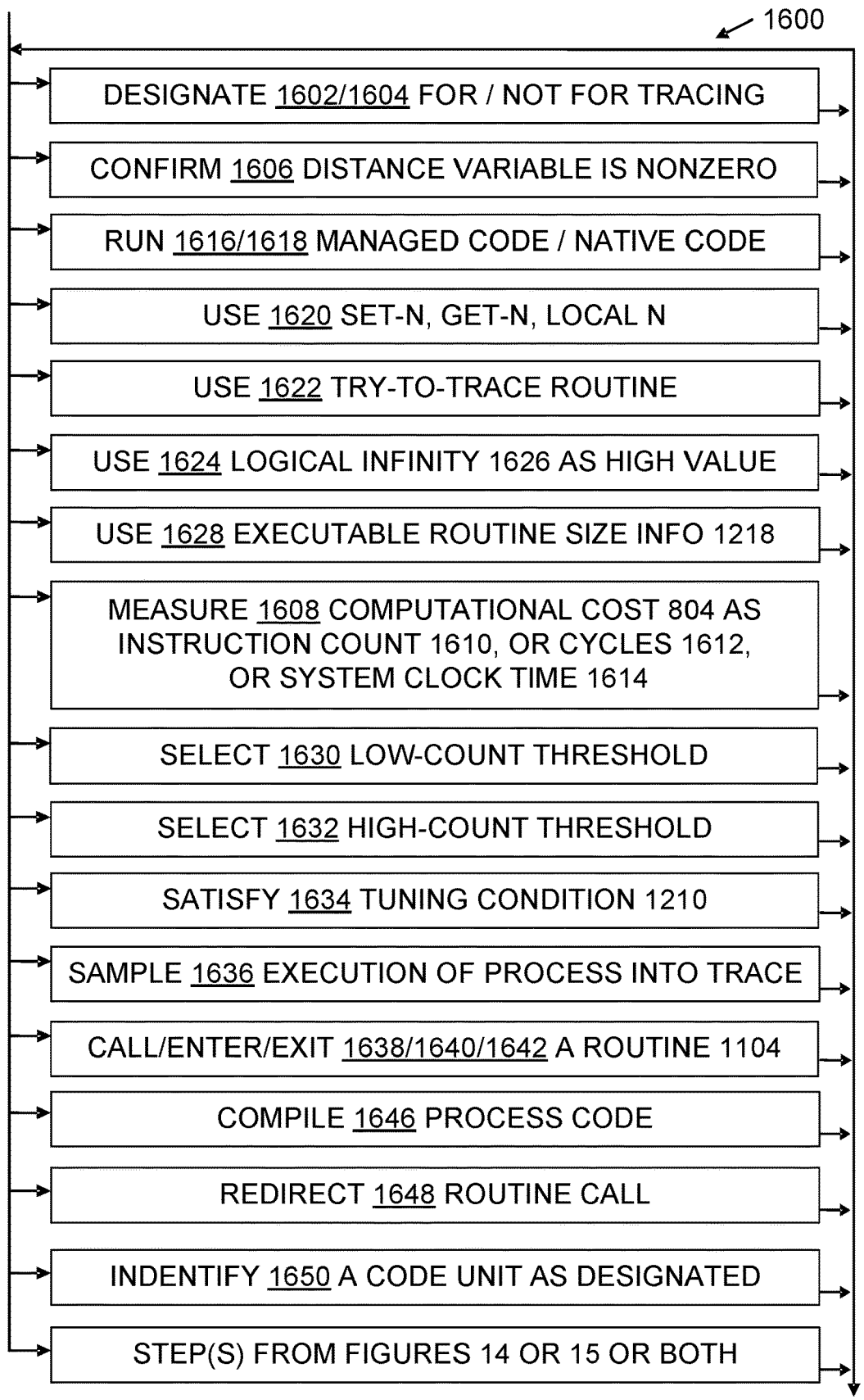
FIG. 16 is a flowchart further illustrating methods that pertain to selective execution tracing using a tracing disablement distance variable.

FIG. 15 is a flowchart illustrating an example of a selective tracing method 1500 which controls 1404 tracing 1012 in a system configured by method 1400 or another suitable method. Any method which configures a system for selective tracing as taught herein is a suitable substitute for method 1400.

The method shown in FIG. 15 includes setting 1502 a distance variable to a high value near an entry point 1202 as the process executes, and calling 1008 a try-to-trace routine 916. This is illustrated for instance by executing the following items shown on the left hand side of FIG. 13:

ENTER C2: DESIGNATED
DV=HIGH
TRY-TO-TRACE( ) [ALREADY ON]

The method shown in FIG. 15 includes setting 1504 a distance variable to a low value near an exit point 1204 as the process executes. On the left hand side of FIG. 13, this setting 1504 step is illustrated for instance by executing DV=LOW just before each of the exits from routine A that are indicated by ENTER B1: NOT DESIGNATED and ENTER C2: DESIGNATED.

The method shown in FIG. 15 includes executing 1006 an instruction and decrementing 1014 a distance variable as the process executes. On the left hand side of FIG. 13, this is illustrated for instance by any of the items, since they are all executed and the distance variable DV implicitly gets decremented as the items execute.

The method shown in FIG. 15 includes recording 1012 execution information into a trace 220 when the distance variable is not zero and tracing is enabled. On the left hand side of FIG. 13, this is illustrated for instance by any of the items between TRACE-ON( ) and TRACE-OFF( ), since they are all executed while DV is nonzero and tracing is enabled. To help emphasize the difference in behavior with DV (left side of FIG. 13) from behavior without DV (right side of FIG. 13), explicit RECORD operations are also shown in FIG. 13. Thus, with DV B1 is recorded (indicated by RECORD B1) but without DV B1 is not recorded (tracing was turned off by the TRACE-OFF( ) call before ENTER B1: NOT DESIGNATED).

The method shown in FIG. 15 includes disabling 1426 tracing when the distance variable reaches 1428 zero or another stop-tracing value. This is illustrated for instance by the following items shown on the left hand side of FIG. 13:

EXECUTE UNTIL D==0
TRACE-OFF( )

Technical methods shown in the Figures or otherwise disclosed will be performed automatically, e.g., by a trace controller 700 or a configured 1402 system 102 having tracing modifications 714, unless otherwise indicated. Methods may also be performed in part automatically and in part manually to the extent action by a human administrator or other human person is implicated, e.g., a person may enter designation criteria 704 into a tool user interface and then launch execution of the process 206 being traced, which causes the tool 122 to configure 1402 the process for tracing and then executed the configured process. But no method contemplated as innovative herein is entirely manual. In a given embodiment zero or more illustrated steps of a method may be repeated, perhaps with different parameters or data to operate on. Steps in an embodiment may also be done in a different order than shown in the Figures. Steps may be performed serially, in a partially overlapping manner, or fully in parallel. The order in which steps are performed during a given method may vary from one performance of the method to another performance of the method. Steps may also be omitted, combined, renamed, regrouped, or otherwise depart from the illustrated flows, provided that the method performed is operable and conforms to at least one claim.

Some embodiments use or provide a computer-implemented process for selective execution tracing. This process uses a distance variable 720 whose values indicate relative distances in computational cost from a disablement of tracing. This memory inspection process includes embedding 1408 in an executable code at a first location a nonzero high-count-ensuring code 1410 which is configured to upon execution set 1502 a distance variable to a value which is not less than a high-count threshold 726, associating 1416 with the executable code an instruction count decrement mechanism 724 or other decrement mechanism 724 which is configured to decrement 1014 the distance variable as the executable code executes, connecting 1420 an execution tracer 204 to the executable code, configuring 1424 a trace controller 700 to disable 1426 tracing by the execution tracer when the distance variable reaches a stop-tracing value (such as zero), and configuring 1424 the trace controller to enable 1430 tracing by the execution tracer during at least part of an execution of the executable code when the distance variable differs from the stop-tracing value.

Some embodiments further include embedding 1408 in the executable code at a second location a low-count-ensuring code 1414 which is configured to upon execution set 1504 the distance variable to a nonzero value which is not greater than a nonzero low-count threshold 728. The low-count threshold is less than the high-count threshold.

The thresholds and other constraints on distance variable values may be determined using various criteria. In some embodiments, at least one of the following criteria are satisfied: the number of instructions in a trace disabler which is configured to disable tracing by the execution tracer is greater than the low-count threshold; the number of instructions in the trace disabler which is configured to disable tracing by the execution tracer is greater than the value of the distance variable at the second location; a computational cost of invoking the trace disabler at the second location to disable tracing by the execution tracer is greater than a computational cost of executing a sequence of M instructions which starts at the second location, where M equals the value of the distance variable at the second location; the value of the distance variable at the second location is not greater than the average number of instructions per routine in the executable code; the low-count threshold is not greater than the average number of instructions per routine in the executable code; a statistical execution cost of tracing a routine which is not designated for tracing is less than a computational cost of invoking the trace disabler at the second location to disable tracing of the routine.

In some embodiments, connecting 1420 the execution tracer 204 to the executable code 208, 308 includes installing 1422 in the executable code a callback 1118 to the execution tracer. The callback is configured to upon execution determine whether to do one or more of the following: continue recording, change the distance variable value, stop recording. Inputs for the determination are the distance variable values and the trace state 730, as illustrated for instance in FIG. 10.

One of skill will appreciate that other methods are also within the scope of the teachings presented here. In particular, other methods may perform selective tracing, in some cases without using the particular APIs, variables, thresholds, state diagram 1000, or designation criteria in examples recited herein. Methods using any aspects or implementations of the selective tracing teachings provided are within the scope of the present disclosure, regardless of whether they are among the examples herein. Any claim consistent with the following is understood to be among the claims taught herein: A selective tracing method including configuring a system with tracing modifications or executing such a configured system, namely, configuring or performing selective tracing operations which replace or reduce invocations of a trace disabler by use of a distance variable as taught herein.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals or mere energy). The storage medium which is configured may be in particular a removable storage medium 114 such as a CD, DVD, or flash memory. A general-purpose memory, which may be removable or not, and may be volatile or not, can be configured into an embodiment using items such as a distance variable 720 with a stop-tracing value 722 and modifier 724 that automatically moves the distance variable toward the stop-tracing value as a process executes, routines 910, 914, 916, and tuning conditions 1210 with constituent thresholds 726, 728 and information 1218, 1220, in the form of data 118 and instructions 116, read from a removable medium 114 and/or another source such as a network connection, to form a configured medium. The configured medium 112 is capable of causing a computer system to perform technical process steps for selectively tracing portions of computer process execution as disclosed herein. The Figures thus help illustrate configured storage media embodiments and process embodiments, as well as system and process embodiments. In particular, any of the process steps illustrated in FIGS. 10, 14, 15, 16 or otherwise taught herein, may be used to help configure a storage medium to form a configured medium embodiment.

Some embodiments use or provide a computer readable storage medium 112, 114 configured with code which upon execution by a computer processor 110 performs a selective execution tracing method. The method includes the following. At an entry point of a code unit, setting 1502 a distance variable 720 to a value which is not less than a nonzero high-count threshold 726, the distance variable measuring relative distances in computational cost from tracing disablement. In conjunction with setting the distance variable to a value not less than the high-count threshold, making a call which enables 1430 tracing by an execution tracer 204 for at most the distance variable's value number of instructions if tracing was not already enabled, and which leaves tracing enabled if tracing was already enabled. At an exit point of the code unit, setting 1504 the distance variable to a nonzero low-count threshold 728 which is less than the high-count threshold. Automatically decrementing 1014 the distance variable as the computer processor executes instructions of a computer process that contains the code unit. An execution tracer tracing 1012 the execution of the computer process when the value of the distance variable is positive and the execution tracer is enabled, and disabling 1426 tracing of the execution of the computer process in response to the value of the distance variable reaching 1428 zero.

In some embodiments, the selective execution tracing method includes identifying 1650 a designated routine, namely, a routine which is designated for tracing. The identification is based on at least one of the following criteria 704: an author of the routine, when the routine was written, whether the routine is marked as confidential, whether the routine is part of a runtime, whether the routine is part of a specified library, whether the routine is part of a specified namespace, whether the routine has a specified parameter, whether the routine is part of a just-in-time compiler, whether the routine is part of a garbage collector, whether the routine is part of a kernel, a name of the routine, a name of a module containing the routine, a direct caller of the routine, or an indirect caller of the routine. This selective execution tracing method also includes tracing 1012 at least the designated routine or other identified 1650 code unit 1100.

In some embodiments, at an early execution point of the code unit, the selective execution tracing method sets 1502 a variable denoted here as N to a value which is not less than the high-count threshold. The variable N is local to the code unit. The early execution point is a point in an execution of the code unit at which at least one of the following criteria is met: no more than ten instructions of the code unit have executed since the code unit received control, no more than one tenth of the instructions of the code unit have executed since the code unit received control. This example selective execution tracing method also modifies code at an exit point of the code unit, to reduce 1504 the value of N by the value of the distance variable at that exit point, thereby setting the distance variable to a nonzero low-count threshold which is less than the high-count threshold.

In some embodiments, the selective execution tracing method includes producing 1012 an execution trace 220 having trace data that corresponds to execution of at least five designated routines 702, 1104 and having at least three gaps 428 in the trace data where tracing was disabled 1426 as a result of the distance variable reaching 1428 zero.

In some embodiments, the selective execution tracing method disables 1426 tracing K times during an execution of the computer process 206, K being positive. In particular, in this example tracing was disabled at least half of said K times because the value of the distance variable reached 1428 zero.

In some embodiments, in response to criteria designating a portion 706 as not for tracing, the selective execution tracing method does not trace at least one of the following: code which is at least part of a library 1122 that is expressly identified as excluded from tracing, code which is at least part of a kernel 120, code which is at least part of a compiler 710, code which is at least part of a garbage collector 712.

In some embodiments, the high-count threshold 726 or the low-count threshold 728 or both thresholds change during execution of the computer process. Changes in a threshold may be made in response to tuning conditions 1210 that are specific to part of the code, for instance.

One of skill will appreciate that other configured medium embodiments are also within the scope of the teachings presented here. In particular, other embodiments may include statutory media configured to perform selective tracing, in some cases without using the particular APIs, variables, thresholds, state diagram 1000, or designation criteria in examples recited herein. Methods using any aspects or implementations of the selective tracing teachings provided are within the scope of the present disclosure, regardless of whether they are among the examples herein. Any claim consistent with the following is understood to be among the claims taught herein: A computer-readable storage medium configured with code which upon execution by a processor performs a selective tracing method which replaces or reduces invocations of a trace disabler by use of a distance variable as taught herein.

Some Additional Combinations and Variations

Any of these combinations of code, variables, data types and data structures, logic, components, presumptions, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 9, 10, 14-16 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific kinds of trace data, and specific values, and thus do not necessarily appear in every embodiment. Those of skill will also understand that program identifiers and some other terminology used in discussing details are implementation-specific and thus do not necessarily pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures is necessarily present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications would not necessarily encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A selective execution tracing system, comprising:
    at least one processor;
    a digital memory in operable communication with the processor;
    an executable code which is configured to, upon execution, perform a computer-implemented process, the executable code having one or more first portions which are designated for tracing, and one or more second portions which are not designated for tracing;
    an execution tracer that traces executing code when tracing is enabled;
    a trace disabler which is configured to, upon execution, disable tracing by the execution tracer;
    a trace enabler which is configured to, upon execution, enable tracing by the execution tracer;
    a trace controller including a distance variable representing a maximum number of instructions of the executable code to trace prior to invoking the trace disabler, the trace controller configured to, upon execution, invoke the trace disabler in conjunction with the distance variable reaching a stop-tracing value and to subsequently invoke the trace enabler in conjunction with the distance variable not having the stop-tracing value; and
    a distance variable modifier configured to (i) incrementally move the distance variable closer to the stop-tracing value when the one or more second portions of the executable code executes, and (ii) move the distance variable away from the stop-tracing value when the one or more first portions of the executable code executes,
    wherein, during execution of at least a subset of the one or more second portions, a value of the distance variable results in the execution tracer tracing the at least a subset of the one or more second portions.

2. The selective execution tracing system of claim 1, wherein the system is further characterized in that a cost-with-distance-variable of the system is less than a cost-without-distance-variable of the system, where:
    the cost-with-distance-variable is a total computational cost of executing the executable code configured with the trace controller, comprising executing an initial invocation of the trace enabler, executing modifications of the distance variable, executing one or more invocations of the trace disabler when the distance variable reaches a stop-tracing value and executing any subsequent invocations of the trace enabler, and including the computational cost of tracing when tracing is enabled; and
    the cost-without-distance-variable is a total computational cost of executing a variation of the executable code that is configured without the trace controller, in which the distance variable is not used, in which the trace enabler is invoked with each entry to an executable code portion which is designated for tracing, and the trace disabler is invoked with each exit from an executable code portion which is designated for tracing, and including the computational cost of tracing when tracing is enabled;
    wherein the computational costs are measured by at least one of the following: total number of instructions executed, total number of processor cycles performed, total system clock time elapsed, or number of trace entries.

3. The selective execution tracing system of claim 1, wherein the one or more first portions of the executable code which are designated for tracing comprise managed code, namely, code that is configured to run under the control of a runtime which implements at least one of memory garbage collection or code compilation.

4. The selective execution tracing system of claim 1, wherein at least one first portion of the executable code which is designated for tracing consists of native code, namely, code that is configured to run without a runtime.

5. The selective execution tracing system of claim 1, wherein the trace controller comprises:

a set-N routine which has a local-n parameter and which is configured to, upon execution, set a thread local variable, denoted here as N, to the value of the parameter local-n;
a get-N routine which is configured to, upon execution, return the current value of the thread local variable N;
a set-DV routine which has a tracing-max parameter and which is configured to, upon execution, set the distance variable to the value of the parameter tracing-max;
a get-DV routine which is configured to, upon execution, return the current value of the distance variable; and
a try-to-trace routine which is configured to, upon execution, enable tracing of a current thread by the execution tracer, if tracing is not already enabled.

6. The selective execution tracing system of claim 1, wherein:
the distance variable modifier is configured to move the distance variable closer to the stop-tracing value when the one or more second portions of the executable code executes by decrementing the distance variable when the executable code executes; and
the trace controller is configured to, upon execution, invoke the trace disabler in conjunction with the distance variable reaching zero as the stop-tracing value and to subsequently invoke the trace enabler in conjunction with the distance variable being positive, the executable code configured to, upon execution, perform at least one of the following to ensure that the distance variable does not equal the stop-tracing value upon entry to any of the one or more first portions of the executable code which are designated for tracing: confirm that the distance variable is nonzero, or set the distance variable to a positive high-count threshold.

7. The selective execution tracing system of claim 6, wherein the high-count threshold satisfies at least one of the following criteria:
the high-count threshold indicates logical infinity;
the high-count threshold exceeds a first number of instructions in any code unit of the one or more first portions of the executable code which are designated for tracing;
the high-count threshold exceeds a second number of instructions in any routine of the one or more first portions of the executable code which are designated for tracing;
the high-count threshold exceeds a third number of instructions in ninety percent of routines of the executable code; or
the high-count threshold exceeds an average number of instructions in the routines of the executable code.

8. The selective execution tracing system of claim 6, wherein the trace controller comprises:
an outer high-count-ensuring code in the executable code at an entry point of a code unit, the high-count-ensuring code configured to, upon execution, set the distance variable to a value which is not less than the high-count threshold, wherein the code unit includes at least one of the following: a thread, a function, a routine, a coroutine, an exception handler, or an interrupt handler;
a low-count-ensuring code in the executable code prior to a call made to a virtual method within the code unit, the low-count-ensuring code configured to, upon execution, set the distance variable to a nonzero value which is not greater than a nonzero low-count threshold, the low-count threshold being less than the high-count threshold; and
an inner high-count-ensuring code in the executable code in a first implementation of the virtual method, configured to, upon execution, set the distance variable to a value which is not less than the high-count threshold; and
wherein a second implementation of the virtual method is free of any code setting the distance variable.

9. The selective execution tracing system of claim 6, wherein the trace controller comprises a high-count-ensuring code in an exception handler, the high-count-ensuring code configured to, upon execution, set the distance variable to a value which is not less than the high-count threshold.

10. A computer-implemented selective execution tracing method which uses a distance variable whose values indicate relative distances in computational cost from a disablement of tracing, the method comprising:
embedding in an executable code a first designation of a first portion of the executable code for tracing, including embedding at a first location a nonzero high-count-ensuring code which is configured to, upon execution, set a distance variable to a value which is not less than a high-count threshold, and embedding in the executable code a second designation of a second portion of the executable code for not tracing;
associating with the executable code a decrement mechanism which is configured to (i) incrementally move the distance variable closer to a stop-tracing value when the second portion of the executable code executes, and (ii) move the distance variable away from the stop-tracing value when the first portion of the executable code executes;
connecting an execution tracer to the executable code;
configuring a trace controller to disable tracing by the execution tracer when the distance variable reaches the stop-tracing value; and
configuring the trace controller to enable tracing by the execution tracer during at least part of an execution of the executable code when the distance variable differs from the stop-tracing value,
wherein, during execution of at least a subset of the second portion of the executable code, a value of the distance variable results in the tracing of the at least a subset of the second portion of the executable code.

11. The computer-implemented selective execution tracing method of claim 10, further comprising embedding in the executable code at a second location a low-count-ensuring code which is configured to, upon execution, set the distance variable to a nonzero value which is not greater than a nonzero low-count threshold, the low-count threshold being less than the high-count threshold.

12. The computer-implemented selective execution tracing method of claim 11, wherein at least one of the following criteria is satisfied:
a first number of instructions in a trace disabler which is configured to disable tracing by the execution tracer is greater than the low-count threshold;
a second number of instructions in the trace disabler which is configured to disable tracing by the execution tracer is greater than a value of the distance variable at the second location;
a first computational cost of invoking the trace disabler at the second location to disable tracing by the execution tracer is greater than a second computational cost of executing a sequence of M instructions which starts at the second location, where M equals the value of the distance variable at the second location;
the value of the distance variable at the second location is not greater than an average number of instructions per routine in the executable code;

the low-count threshold is not greater than the average number of instructions per routine in the executable code; or a statistical execution cost of tracing a routine which is not designated for tracing is less than a third computational cost of invoking the trace disabler at the second location to disable tracing of the routine.

13. The computer-implemented selective execution tracing method of claim 10, wherein connecting the execution tracer to the executable code comprises installing in the executable code a callback to the execution tracer, the callback configured to, upon execution, determine whether to do one or more of the following: continue recording, change the distance variable value, or stop recording.

14. A computer readable storage medium configured with code which, upon execution by a computer processor, causes a computer system to perform at least the following:

execute, at the computer processor, instructions of an executable code as a computer process, the executable code including a first code unit that is designated for tracing, and a second code unit that is designated for not tracing; and while executing the instructions of the executable code as the computer process, at an entry point of the first code unit, set a distance variable to a value which is not less than a nonzero high-count threshold, the distance variable measuring relative distances in computational cost from tracing disablement;

in conjunction with setting the distance variable to the value not less than the high-count threshold, make a call which enables tracing by an execution tracer for at most the distance variable's value number of instructions if tracing was not already enabled, and which leaves tracing enabled if tracing was already enabled;

at an exit point of the first code unit, set the distance variable to a nonzero low-count threshold which is less than the high-count threshold;

automatically decrement the distance variable as the computer processor executes the instructions of the executable code;

trace the execution of the computer process by the execution tracer when the value of the distance variable is positive and the execution tracer is enabled; and disable tracing of the execution of the computer process in response to the value of the distance variable reaching zero, wherein a value of the distance variable is positive during execution of at least one instruction of the second code unit that is designated for not tracing, resulting in the execution tracer tracing the at least one instruction of the second code unit.

15. The computer readable storage medium of claim 14, wherein the computer readable storage medium is also configured with code which, upon execution by the computer processor, causes the computer system to perform at least the following:

identify a designated routine, namely, a routine which is designated for tracing based on at least one of the following criteria: an author of the routine, when the routine was written, whether the routine is marked as confidential, whether the routine is part of a runtime, whether the routine is part of a specified library, whether the routine is part of a specified namespace, whether the routine has a specified parameter, whether the routine is part of a just-in-time compiler, whether the routine is part of a garbage collector, whether the routine is part of a kernel, a name of the routine, a name of a module containing the routine, a direct caller of the routine, or an indirect caller of the routine; and trace at least the designated routine.

16. The computer readable storage medium of claim 14, wherein the computer readable storage medium is also configured with code which, upon execution by the computer processor, causes the computer system to perform at least the following:

at an early execution point of the code unit, set a variable denoted here as N to a value which is not less than the high-count threshold, where the variable N is local to the code unit, and where the early execution point is a point in an execution of the code unit at which at least one of the following criteria is met: no more than ten instructions of the code unit have executed since the code unit received control, or no more than one tenth of the instructions of the code unit have executed since the code unit received control; and at an exit point of the code unit, reduce the value of N by the value of the distance variable at that exit point, and setting the distance variable to a nonzero low-count threshold which is less than the high-count threshold.

17. The computer readable storage medium of claim 14, wherein the computer readable storage medium is also configured with code which, upon execution by the computer processor, causes the computer system to produce an execution trace having trace data corresponding to execution of at least five designated routines and having at least three gaps in the trace data where tracing was disabled as a result of the distance variable reaching zero.

18. The computer readable storage medium of claim 14, wherein the computer readable storage medium is also configured with code which, upon execution by the computer processor, causes the computer system to disable tracing K times during an execution of the computer process, K being positive, and wherein tracing was disabled at least half of said K times because the value of the distance variable reached zero.

19. The computer readable storage medium of claim 14, wherein the computer readable storage medium is also configured with code which, upon execution by the computer processor, causes the computer system to not trace at least one of the following:

code which is at least part of a library that is expressly identified as excluded from tracing;

code which is at least part of a kernel;

code which is at least part of a compiler; or code which is at least part of a garbage collector.

20. The computer readable storage medium of claim 14, wherein the high-count threshold varies during execution of the computer process.

* * * * *